US008128480B2

(12) United States Patent
Muir

(10) Patent No.: US 8,128,480 B2
(45) Date of Patent: Mar. 6, 2012

(54) GAMING DEVICE HAVING DYNAMIC PAYLINES

(75) Inventor: David H. Muir, Warnesbay (AU)

(73) Assignee: IGT, Reno, NV (US)

( * ) Notice: Subject to any disclaimer, the term of this patent is extended or adjusted under 35 U.S.C. 154(b) by 1410 days.

(21) Appl. No.: 11/426,448

(22) Filed: Jun. 26, 2006

(65) Prior Publication Data

US 2007/0026923 A1 Feb. 1, 2007

Related U.S. Application Data

(60) Provisional application No. 60/704,209, filed on Jul. 29, 2005.

(51) Int. Cl.
*A63F 13/00* (2006.01)

(52) U.S. Cl. ................ 463/20; 463/16; 463/17; 463/18; 463/19; 463/21

(58) Field of Classification Search ............... 463/20–21
See application file for complete search history.

(56) References Cited

U.S. PATENT DOCUMENTS 4,198,052 A 4/1980 Gauselmann
4,448,419 A 5/1984 Telnaes
4,618,150 A 10/1986 Kimura
4,624,459 A 11/1986 Kaufman
4,695,053 A 9/1987 Vazquez, Jr. et al.
4,732,386 A 3/1988 Rayfiel
4,756,531 A 7/1988 DiRe et al.
4,826,169 A 5/1989 Bessho et al.
4,838,552 A 6/1989 Hagiwara
4,874,173 A 10/1989 Kishishita
4,991,848 A 2/1991 Greenwood et al.
5,019,973 A 5/1991 Wilcox et al.

(Continued)

FOREIGN PATENT DOCUMENTS

AU 199917318 A1 9/1999

(Continued)

OTHER PUBLICATIONS

Big Business Advertisement, written by VIDCO, published prior to Jun. 26, 2006.

(Continued)

*Primary Examiner* — Ronald Laneau
*Assistant Examiner* — Justin Myhr
(74) *Attorney, Agent, or Firm* — K&L Gates LLP

(57) ABSTRACT

A gaming device including a plurality of symbol generators with a plurality of symbols on or associated with each symbol generator. At least one and preferably a plurality of the symbols are reflector symbols. A reflector symbol is a symbol that, when generated on one of the reels, causes any payline which runs through such symbol to be reflected back across one or more of the reels. In operation, after providing the player any award based on the symbols generated on any wagered on paylines, the gaming device determines if at least one reflector symbol is generated on at least one of the wagered on paylines. If at least one reflector symbol is generated on at least one of the wagered on paylines, the generated reflector symbol causes the activated payline which runs through the generated reflector symbol to reflect back across one, more or each of the reels to form a supplemental payline. The gaming device determines if an award is associated with any of the symbols or symbol combinations generated on the supplemental payline and provides any determined award to the player.

42 Claims, 12 Drawing Sheets

U.S. PATENT DOCUMENTS

| | | | |
|---|---|---|---|
| 5,085,436 | A | 2/1992 | Bennett |
| 5,102,134 | A | 4/1992 | Smyth |
| 5,102,137 | A | 4/1992 | Ekiert |
| 5,209,479 | A | 5/1993 | Nagao et al. |
| 5,308,065 | A | 5/1994 | Bridgeman et al. |
| 5,332,228 | A | 7/1994 | Schultz |
| 5,342,047 | A | 8/1994 | Heidel et al. |
| 5,344,144 | A | 9/1994 | Canon |
| 5,393,061 | A | 2/1995 | Manship et al. |
| 5,395,111 | A | 3/1995 | Inoue |
| 5,413,342 | A | 5/1995 | Kaplan |
| 5,423,539 | A | 6/1995 | Nagao |
| 5,431,408 | A | 7/1995 | Adams |
| 5,449,173 | A | 9/1995 | Thomas et al. |
| 5,542,669 | A | 8/1996 | Charron et al. |
| 5,569,084 | A | 10/1996 | Nicastro et al. |
| 5,580,053 | A | 12/1996 | Crouch |
| 5,580,055 | A | 12/1996 | Hagiwara |
| 5,584,764 | A | 12/1996 | Inoue |
| 5,609,524 | A | 3/1997 | Inoue |
| 5,611,535 | A | 3/1997 | Tiberio |
| 5,697,843 | A | 12/1997 | Manship et al. |
| 5,704,835 | A | 1/1998 | Dietz, II |
| 5,722,891 | A | 3/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,788,573 | A | 8/1998 | Baerlocher et al. |
| 5,807,172 | A | 9/1998 | Piechowiak |
| 5,810,361 | A | 9/1998 | Kadlic |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,882,261 | A | 3/1999 | Adams |
| 5,890,962 | A | 4/1999 | Takemoto |
| 5,902,184 | A | 5/1999 | Bennett et al. |
| 5,919,088 | A | 7/1999 | Weiss |
| 5,927,714 | A | 7/1999 | Kaplan |
| 5,947,820 | A | 9/1999 | Morro et al. |
| 5,951,397 | A | 9/1999 | Dickinson |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,997,400 | A | 12/1999 | Seelig et al. |
| 5,997,401 | A | 12/1999 | Crawford |
| 6,004,207 | A | 12/1999 | Wilson, Jr. et al. |
| 6,004,208 | A | 12/1999 | Takemoto et al. |
| 6,015,346 | A | 1/2000 | Bennett |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,095,921 | A | 8/2000 | Walker et al. |
| 6,102,798 | A | 8/2000 | Bennett |
| 6,113,098 | A | 9/2000 | Adams |
| 6,120,031 | A | 9/2000 | Adams |
| 6,120,377 | A | 9/2000 | McGinnis, Sr. et al. |
| 6,120,378 | A | 9/2000 | Moody |
| 6,123,333 | A | 9/2000 | McGinnis, Sr. et al. |
| 6,126,542 | A | 10/2000 | Fier |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,165,070 | A | 12/2000 | Nolte et al. |
| 6,168,520 | B1 | 1/2001 | Baerlocher et al. |
| 6,174,233 | B1 | 1/2001 | Sunaga et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,429 | B1 | 3/2001 | Demar et al. |
| 6,203,430 | B1 | 3/2001 | Walker et al. |
| 6,220,959 | B1 | 4/2001 | Holmes, Jr. et al. |
| 6,224,483 | B1 | 5/2001 | Mayeroff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,241,607 | B1 | 6/2001 | Payne et al. |
| 6,251,013 | B1 | 6/2001 | Bennett |
| 6,261,177 | B1 | 7/2001 | Bennett |
| 6,261,178 | B1 | 7/2001 | Bennett |
| 6,270,409 | B1 | 8/2001 | Shuster |
| 6,270,411 | B1 | 8/2001 | Gura et al. |
| 6,299,165 | B1 | 10/2001 | Nagano |
| 6,299,170 | B1 | 10/2001 | Yoseloff |
| 6,302,398 | B1 | 10/2001 | Vecchio |
| 6,309,299 | B1 | 10/2001 | Weiss |
| 6,309,300 | B1 | 10/2001 | Glavich |
| 6,311,976 | B1 | 11/2001 | Yoseloff et al. |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,322,078 | B1 | 11/2001 | Adams |
| 6,328,649 | B1 | 12/2001 | Randall et al. |
| 6,336,860 | B1 | 1/2002 | Webb |
| 6,346,043 | B1 | 2/2002 | Colin et al. |
| 6,347,996 | B1 | 2/2002 | Gilmore et al. |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,375,570 | B1 | 4/2002 | Poole |
| 6,394,902 | B1 | 5/2002 | Glavich et al. |
| 6,398,218 | B1 | 6/2002 | Vancura |
| 6,409,602 | B1 | 6/2002 | Wiltshire et al. |
| 6,413,162 | B1 | 7/2002 | Baerlocher et al. |
| 6,419,579 | B1 | 7/2002 | Bennett |
| 6,439,943 | B1 | 8/2002 | Aoki et al. |
| 6,439,993 | B1 | 8/2002 | O'Halloran |
| 6,454,266 | B1 | 9/2002 | Breeding et al. |
| 6,461,241 | B1 | 10/2002 | Webb et al. |
| 6,464,581 | B1 | 10/2002 | Yoseloff et al. |
| 6,491,584 | B2 | 12/2002 | Graham et al. |
| 6,494,454 | B2 | 12/2002 | Adams |
| 6,517,432 | B1 | 2/2003 | Jaffe |
| 6,547,242 | B1 | 4/2003 | Sugiyama et al. |
| 6,551,187 | B1 | 4/2003 | Jaffe |
| 6,558,254 | B2 | 5/2003 | Baelocher et al. |
| 6,561,900 | B1 | 5/2003 | Baerlocher et al. |
| 6,602,137 | B2 | 8/2003 | Kaminkow et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,609,971 | B2 | 8/2003 | Vancura |
| 6,616,142 | B2 | 9/2003 | Adams |
| 6,632,139 | B1 | 10/2003 | Baerlocher |
| 6,634,945 | B2 | 10/2003 | Glavich et al. |
| 6,676,511 | B2 | 1/2004 | Payne et al. |
| 6,676,512 | B2 | 1/2004 | Fong et al. |
| 6,805,349 | B2 * | 10/2004 | Baerlocher et al. ........ 273/138.2 |
| 6,869,357 | B2 | 3/2005 | Adams et al. |
| 6,960,133 | B1 | 11/2005 | Marks et al. |
| 6,966,835 | B2 | 11/2005 | Graham |
| 7,001,274 | B2 | 2/2006 | Baerlocher et al. |
| 7,014,560 | B2 | 3/2006 | Glavich et al. |
| 7,156,736 | B2 | 1/2007 | Adams et al. |
| 2001/0054794 | A1 | 12/2001 | Cole et al. |

| | | | | |
|---|---|---|---|---|
| 2002/0014740 | A1 | 2/2002 | Ainsworth | |
| 2002/0025844 | A1 | 2/2002 | Casey et al. | |
| 2002/0055382 | A1 | 5/2002 | Meyer | |
| 2002/0065124 | A1 * | 5/2002 | Ainsworth | 463/20 |
| 2002/0094857 | A1 | 7/2002 | Meyer | |
| 2002/0119814 | A1 * | 8/2002 | Fong et al. | 463/13 |
| 2003/0013518 | A1 | 1/2003 | Graham | |
| 2003/0045345 | A1 | 3/2003 | Berman | |
| 2003/0069068 | A1 | 4/2003 | Kaminkow | |
| 2003/0092480 | A1 | 5/2003 | White et al. | |
| 2003/0114215 | A1 | 6/2003 | Adams et al. | |
| 2003/0203752 | A1 | 10/2003 | Kaminkow et al. | |
| 2003/0216165 | A1 * | 11/2003 | Singer et al. | 463/20 |
| 2004/0009803 | A1 | 1/2004 | Bennett et al. | |
| 2004/0023714 | A1 | 2/2004 | Asdale | |
| 2004/0048650 | A1 | 3/2004 | Mierau et al. | |
| 2004/0058727 | A1 | 3/2004 | Marks et al. | |
| 2004/0097280 | A1 | 5/2004 | Gauselmann | |
| 2004/0192431 | A1 | 9/2004 | Singer et al. | |
| 2004/0242314 | A1 | 12/2004 | Casey | |
| 2005/0054420 | A1 | 3/2005 | Cregan et al. | |
| 2005/0054429 | A1 * | 3/2005 | Baerlocher et al. | 463/25 |
| 2005/0054436 | A1 | 3/2005 | Frizzell et al. | |
| 2005/0107154 | A1 * | 5/2005 | Pacey | 463/20 |
| 2005/0124406 | A1 | 6/2005 | Cannon | |
| 2005/0148384 | A1 | 7/2005 | Marks et al. | |
| 2005/0170876 | A1 | 8/2005 | Masci et al. | |
| 2005/0192081 | A1 | 9/2005 | Marks et al. | |
| 2006/0089191 | A1 | 4/2006 | Singer et al. | |
| 2007/0129134 | A1 | 6/2007 | Barrie | |
| 2007/0191087 | A1 | 8/2007 | Thomas et al. | |

FOREIGN PATENT DOCUMENTS

| | | | |
|---|---|---|---|
| EP | 0 060 019 | | 9/1982 |
| EP | 0 238 289 | A3 | 9/1987 |
| EP | 0 410 789 | A2 | 7/1990 |
| EP | 0 945 837 | A2 | 9/1999 |
| EP | 0 984 408 | A2 | 3/2000 |
| EP | 1 205 894 | A2 | 10/2001 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 161 008 | A | 1/1986 |
| GB | 2170636 | | 2/1986 |
| GB | 2 170 643 | A | 8/1986 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |
| GB | 2 226 436 | A | 6/1990 |
| GB | 2 226 907 | A | 7/1990 |
| GB | 2 242 300 | A | 9/1991 |
| GB | 2 262 642 | A | 6/1993 |
| GB | 2 316 214 | A | 2/1998 |
| GB | 2 328 311 | A | 2/1999 |
| GB | 2 393 019 | A | 3/2004 |
| GB | 2 402 256 | A | 12/2004 |
| WO | WO 96/08799 | | 3/1996 |
| WO | WO 97/32285 | | 9/1997 |
| WO | WO 00/66235 | | 11/2000 |
| WO | WO 00/76606 | A1 | 12/2000 |
| WO | WO 01/19476 | | 3/2001 |
| WO | WO 01/87441 | | 11/2001 |
| WO | WO 03/049055 | | 3/2003 |
| WO | WO 03/026758 | | 4/2003 |
| WO | WO 2004/025584 | | 3/2004 |
| WO | WO 2004/082779 | | 9/2004 |

OTHER PUBLICATIONS

Gambling Article, written by Daniel R. Mead, published in Oct. 1993.
Ole Advertisement, written by Pacific Gaming, published prior to Jun. 26, 2006.
Bally Medalist Advertisement [online] [retrieved on Apr. 16, 2007, available prior to Jun. 26, 2006]. Retrieved from the Internet at <URL: http://cosmicpinball.com>.
Just Chillin Advertisment [online] [retrieved on Apr. 9, 2007, available prior to Jun. 26, 2006]. Retrieved from the Internet at <URL: http://www.novagamingllc.com>.
Barn Yard Article, written by Strictly Slots, published in Mar. 2002.
Barn Yard Advertisement written by Aristocrat, not dated.
Bonus Line Lightning Advertisement, written by Bally Gaming, published in 2006.
Break the Spell Advertisement, written by Atronic, published in 1999.
Catch a Wave Advertisement, written by IGT, published in Dec. 2001.
Cossack Dance Advertisement, written by Olympic Video Gaming, published prior to Jul. 2005.
Description of Animating Symbol Feature in Gaming Machine, IGT, published prior to Jul. 2005.
Description of Gaming Machine with Animating Symbols, IGT, published prior to Jul. 2005.
Description of Symbol Feature in Australian UFO Gaming Machine, Barcrest, Ltd., 1995.
Double Diamond Line Advertisement, written by IGT, published in 2003.
Enchanted Unicorn Advertisement, written by IGT, published in 2003.
Enchanted Unicorn Advertisement, written by IGT, published in 2001.
Fey, Marshall, Slot machines—A Pictorial History of the First 100 Years, 1997, Liberty Bell Books, 5th Ed., p. 13.
Fishin' Buddies Article, written by Strictly Slots, published in Apr. 2001.
Gold Fever Advertisement ,written by Atronic Casino Technology, Ltd., published 1999.
Goooaal! Advertisement, written by Bally Gaming, Inc. , published in 2000.
Happy Camper Advertisement, written by IGT, published in 2004.
Jewel in the Crown Advertisement, written by IGT, published 1999.
Joker's Wild Advertisement, written by IGT, published prior to Jul. 2005.
The Latest Buzz Article, written by Bally Gaming Systems, published in Fall 2000.
Loco Loot Article, written by Strictly Slots, published in May 2002.
I Love Lucy: Vitameatavegamin and I Love Lucy, Chocolate Factory IGT articles, written by Strictly Slots, published in Jan. 2003 and May 2003.
Mountain Money Article, written by Strictly Slots, published in Jun. 2002.
Penguin Pays Advertisement, written by Aristocrat, published in 1998.
REEL MAGIC™ Gaming Machine Description written by IGT, available in 1986.
Reelin-n-Rockin Advertisement, written by Aristocrat, published in 1999.
Stooges II Article, written by Strictly Slots, published in Jun. 2001.
Wild Bear Salmon Run Advertisement, written by IGT, published in 2003.
Wild Cougar Article, written by Strictly Slots, published in 2004.
Wild Streak Article, written by Strictly Slots, published in Mar. 2001.
"Letter from Mr. McClarnon regarding disclosure of U.S. Patent No. 6,409,602; dated Aug. 6, 2008."
UK International Search Report for UK Application No. 0613312.8.

* cited by examiner

GAMING DEVICE HAVING DYNAMIC PAYLINES

PRIORITY CLAIM

This application is a non-provisional application of, claims priority to and the benefit of U.S. Provisional Application No. 60/704,209, filed Jul. 29, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a game in which a player has an opportunity to win multiple awards and potentially large awards or credits are ways to enhance player enjoyment and excitement. Currently, gaming machines or devices provide games wherein a player has one or more opportunities to obtain a winning symbol combination on mechanical or video reels. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. In these gaming devices, the player wagers on a designated number or combination of paylines, such as one, two, three, five, ten or fifteen paylines. After the player wagers on one or more paylines, the gaming device generates and displays a plurality of symbols and an award is provided based on the symbols or combinations of symbols generated along the one or more wagered on paylines. In other gaming devices, a payout is provided based on a "scatter pay." A scatter pay includes a pay for the occurrence of designated symbols anywhere on the symbol display. In these gaming devices, symbols generated on the symbol display are evaluated for winning combinations as if the symbols were generated along a traditional payline of adjacently arranged symbols.

In one known gaming device, a payline upon which a player did not directly wager is activated, thus providing the player an increased chance of winning an award. In another known gaming device, one payline is associated with a greater value than another payline, wherein the greater valued payline provides a greater award for the same symbol combination than another payline. For example, a higher multiplier can be associated with the greater valued payline. Another known gaming device randomly selects a set of symbol locations which define an additional mystery payline in a game. The mystery payline, however, is not enhanced by any value.

To increase player enjoyment and excitement, it is desirable to provide players with new and different payline features in a slot machine.

SUMMARY

The present disclosure relates in general to a gaming device and method and more particularly to a gaming device and method having dynamic payline features.

In one embodiment, the gaming device includes a plurality of symbol generators with at least one and preferably a plurality of symbols on or associated with each symbol generator. In one embodiment, the symbol generators are reels which are operable to generate symbols at a plurality of symbol positions associated with the reels. One or more base paylines are associated with the symbol positions at which the reels generate or display symbols. In one embodiment, at least one and preferably a plurality of the symbols are reflector symbols. A reflector symbol is a symbol that, when generated on one of the reels, causes any payline which runs through such reflector symbol (or the symbol position of the reflector symbol) to be reflected from the generated reflector symbol to at least one supplemental symbol location or symbol position. In one embodiment, the supplemental payline is reflected back across one or more of the reels which the payline previously passed through. In another embodiment, the supplemental payline is reflected to extend up or down the same reel column which generated the reflector symbol. In another embodiment, the supplemental payline is reflected to extend up or down the same reel column which generated the reflector symbol and then back across one or more of the reels which the payline previously passed through. In another embodiment, the supplemental payline extends up or down the same reel column which generated the reflector symbol and then forward across one or more of the reels. In one embodiment, the supplemental payline must be wagered on for the reflector symbol to function as described above.

In operation of one embodiment of the gaming device disclosed herein, a player places a wager on a number of base paylines. Each wagered on payline is activated. The plurality of reels generate a plurality of symbols and the gaming device determines if an award is associated with any of the symbols or symbol combinations generated on the wagered on or activated paylines. If an award is associated with any of the symbols or symbol combinations generated on the activated paylines, the determined award is provided to the player.

In addition to determining any award based on the generated symbols, the gaming device also determines if at least one reflector symbol is generated on at least one of the wagered on or activated paylines. If at least one reflector symbol is generated on at least one of the active paylines, in one embodiment, the generated reflector symbol causes the activated payline which runs through the generated reflector symbol to reflect back across one, more or each of the reels to form a supplemental or extra payline. In this embodiment, the supplemental payline extends from the reflector symbol at a different angle (than the angle of the payline or a portion of the payline which ran through the reflector symbol) and extends backwards in a different path or in a different direction than the payline which ran though the reflector symbol. In another embodiment, the generated reflector symbol causes the activated payline which runs through the generated reflector symbol to extend up or down the same reel which generated the reflector symbol. Regardless of the manner in which the supplemental payline is formed, the gaming device determines if an award is associated with any of the symbols or symbol combinations generated on the supplemental payline. If an award is associated with any of the symbols or symbol combinations generated on the supplemental payline, the gaming device provides the determined award to the player and the game ends. It should be appreciated that more than one or multiple supplemental paylines may be caused to be formed by the generation of a reflector symbol or multiple reflector symbols. In these embodiments, the number of generated supplemental paylines may be predetermined, randomly determined, based on the player's wager (i.e., the higher the wager, the greater the number of supplemental paylines), based on the player's status (e.g., determined through a player tracking system) or based on any other suitable manner.

In one alternative embodiment, if a supplemental payline is reflected back through one or more of the reels, the gaming device regenerates and displays a plurality of symbols on one or more of the reels. In one embodiment, a designated reel regenerates symbols if the supplemental payline intersects with the designated reel. In another embodiment, at least one reel regenerates symbols if the supplemental payline extends to, but does not extend past that reel. In these embodiments, if one or more reels regenerate symbols, the gaming device determines if any awards are associated with any of the symbols or symbol combinations generated on the initially wagered paylines or the formed supplemental payline(s). If any awards are associated with any of the symbols or symbol combinations generated on the initially wagered on paylines or the formed supplemental payline(s), the determined awards are provided to the player.

In another embodiment, at least one and preferably a plurality of the symbols are emanator symbols. An emanator symbol is a symbol that, when generated on one of the reels, causes one or more supplemental paylines to emanate from the generated emanator symbol to symbol positions on one or more of the reels. In this embodiment, after determining any awards based on the generated symbols on the wagered on paylines, the gaming device determines if at least one emanator symbol is generated on at least one of the wagered on paylines. If at least one emanator symbol is generated on at least one of the wagered on paylines, one or more supplemental paylines emanate from the generated emanator symbol. The supplemental paylines extend out in one or more directions from the generated emanator symbol to zero, one or more of the adjacent reels. In one embodiment, the supplemental payline emanates from the generated emanator symbol back across one or more of the reels. In another embodiment, the supplemental payline emanates from the generated emanator symbol up or down the same reel which generated the emanator symbol. In another embodiment, the supplemental payline emanates from the generated emanator symbol up or down the same reel which generated the emanator symbol and then back across one or more of the reels. If any awards are associated with any of the symbols or symbol combinations generated on the supplemental payline, the determined awards are provided to the player. In an alternative embodiment, if at least one emanator symbol is generated, regardless of whether or not the emanator symbol is generated on a wagered on payline, one or more supplemental paylines emanate from the generated emanator symbol. In another embodiment, one or more supplemental paylines emanate from a randomly determined or predetermined symbol position on the reels. In one embodiment, the supplemental payline must be wagered on for the emanator symbol to function as described above. It should be appreciated that more than one or multiple supplemental paylines may be caused to be formed by the generation of an emanator symbol or multiple emanator symbols. In these embodiments, the number of generated supplemental paylines may be predetermined, randomly determined, based on the player's wager (i.e., the higher the wager, the greater the number of supplemental paylines), based on the player's status (e.g., determined through a player tracking system) or based on any other suitable manner.

In another embodiment, at least one and preferably a plurality of the symbols are emanator symbols and at least one and preferably a plurality of the symbols are attractor symbols. An attractor symbol is a symbol that, when generated on one of the reels, causes one or more supplemental paylines to emanate from the generated emanator symbol across one or more of the symbol positions toward the generated attractor symbol. In one embodiment with attractor symbols, if an emanator symbol is generated and no attractor symbol is generated, no supplemental payline will emanate from the generated emanator symbol. In another embodiment with attractor symbols, if at least one emanator symbol is generated and at least one attractor symbol is generated, a supplemental payline will emanate from the generated emanator symbol to the generated attractor symbol. In this embodiment, the gaming device determines if any awards are associated with any of the symbols or symbol combinations generated on the formed supplemental payline. If any awards are associated with any of the symbols or symbol combinations generated on the formed supplemental payline, the determined awards are provided to the player. In one embodiment, the supplemental payline must be wagered on for the emanator symbol and/or the attractor symbol to function as described above. It should be appreciated that more than one or multiple supplemental paylines may be caused to be formed by the generation of an attractor symbol, an emanator symbol, multiple attractor symbols or multiple emanator symbols. In these embodiments, the number of generated supplemental paylines may be predetermined, randomly determined, based on the player's wager (i.e., the higher the wager, the greater the number of supplemental paylines), based on the player's status (e.g., determined through a player tracking system) or based on any other suitable manner.

In one embodiment, the gaming device disclosed herein is employed in conjunction with one or more primary games. In this embodiment, the player must place one or more separate wagers for each separate symbol generation. In another embodiment, the gaming device disclosed herein is employed in association with free spins or free activations of the symbol generators. In this embodiment, the player is provided a number of free spins or free activations of the symbol generators during which symbols are generated and the game proceeds until a predetermined number of free spins, such as zero, remain or a terminating event or condition occurs and the free spin mode or sequence ends. In one embodiment wherein a number of free spins are provided to a player, if a supplemental payline is formed, the supplemental payline may remain active for one, a plurality or each of the remaining free spins. In different embodiments, the number of remaining free spins which the formed supplemental payline remain active for is predetermined, randomly determined, determined based on the player's wager, determined based on the player's status (e.g., determined through a player tracking system), determined from the occurrence of one or more symbols or determined based on any other suitable method.

The gaming device disclosed herein increases player enjoyment by providing the player an opportunity to be provided awards based on one or more supplemental paylines which are formed based on one or more of the generated designated symbols. By providing players with new reel features which involve one or more supplemental paylines dynamically formed during a game, the gaming device provides the player with a more exciting gaming experience.

Additional features and advantages are described in, and will be apparent from, the following Detailed Description and the figures.

DETAILED DESCRIPTION

Gaming Device and Electronics

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
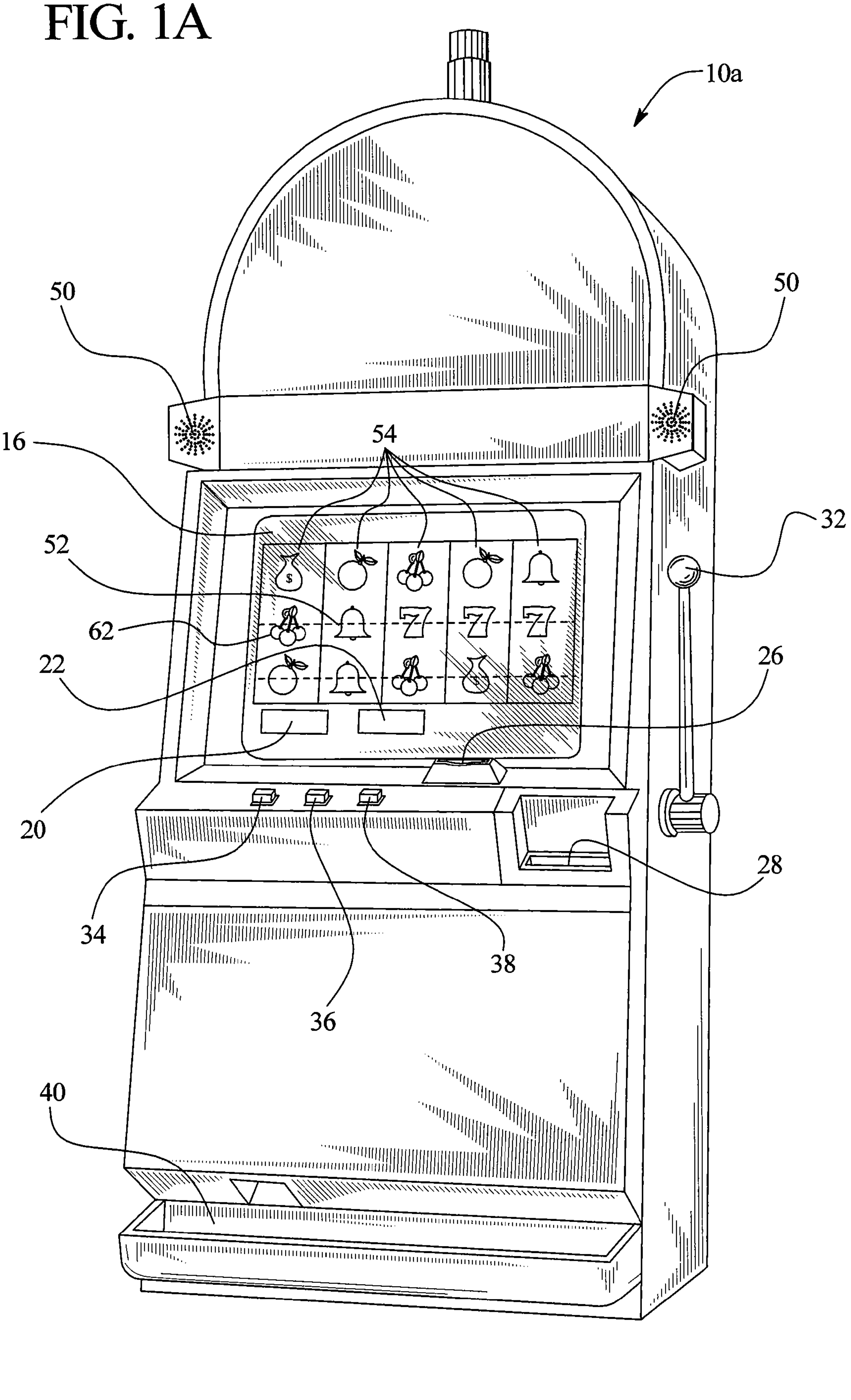
FIG. 1A is a front-side perspective view of one embodiment of the gaming device disclosed herein.
Figure 1B:
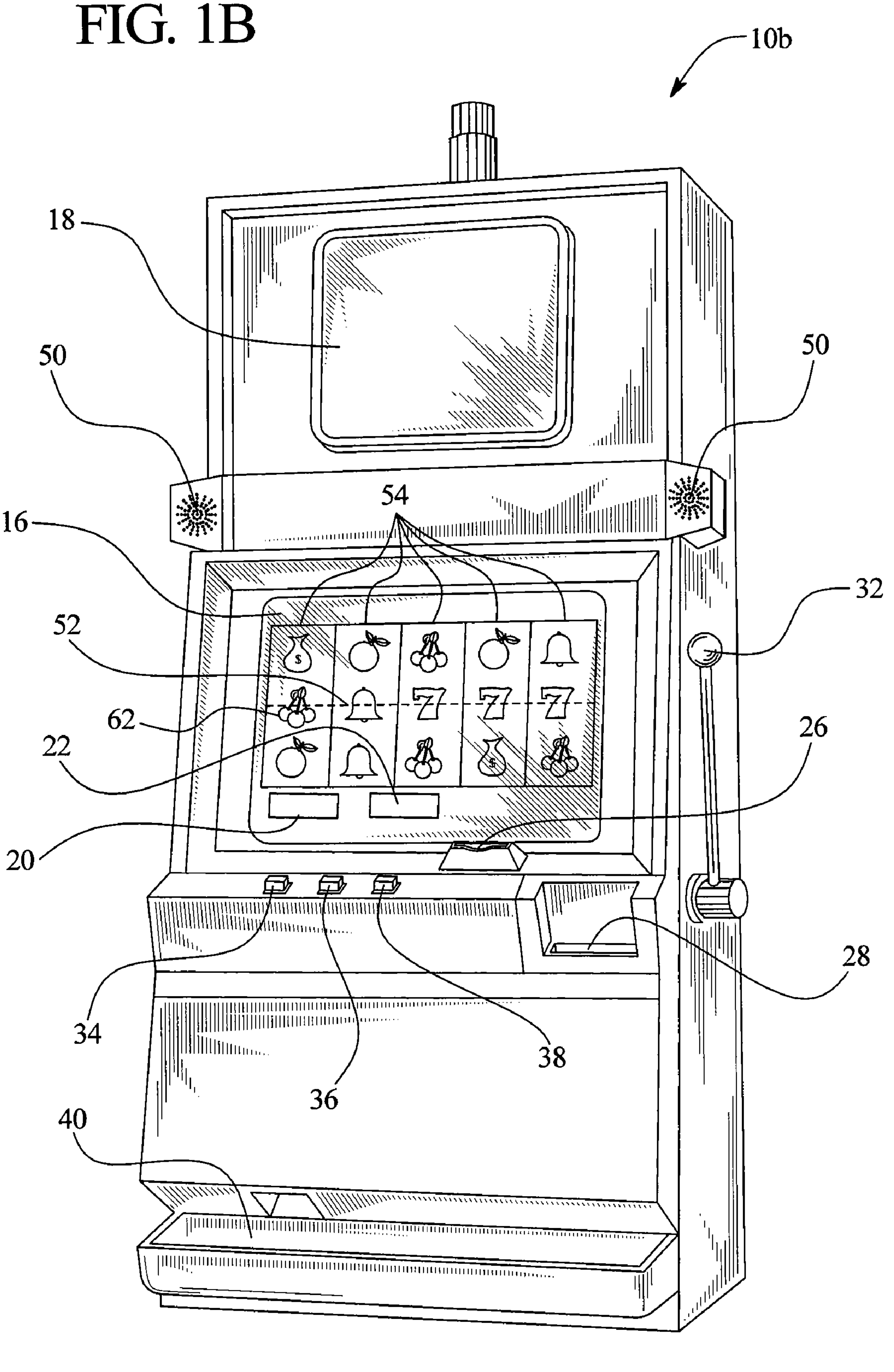
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
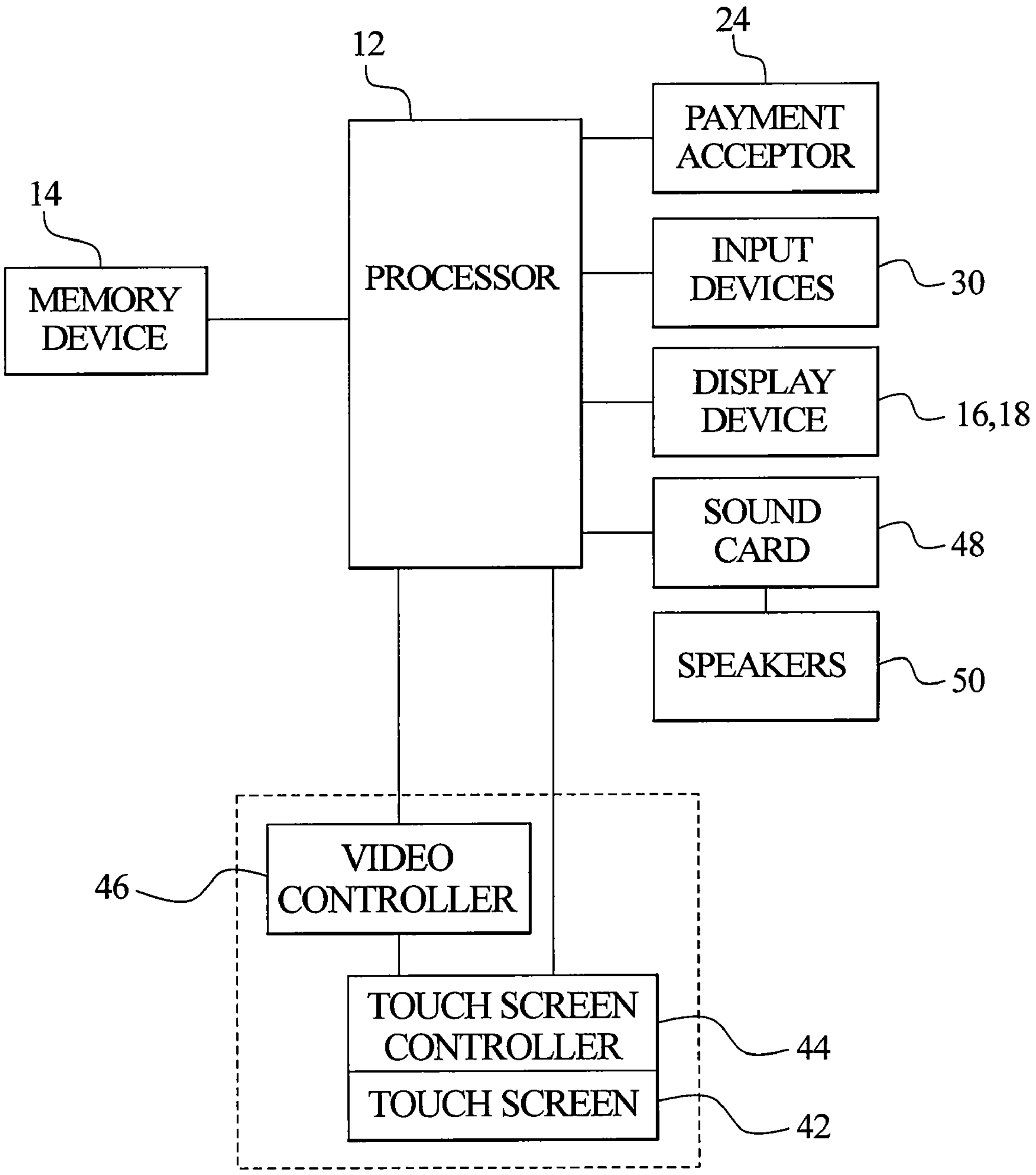
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be further appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
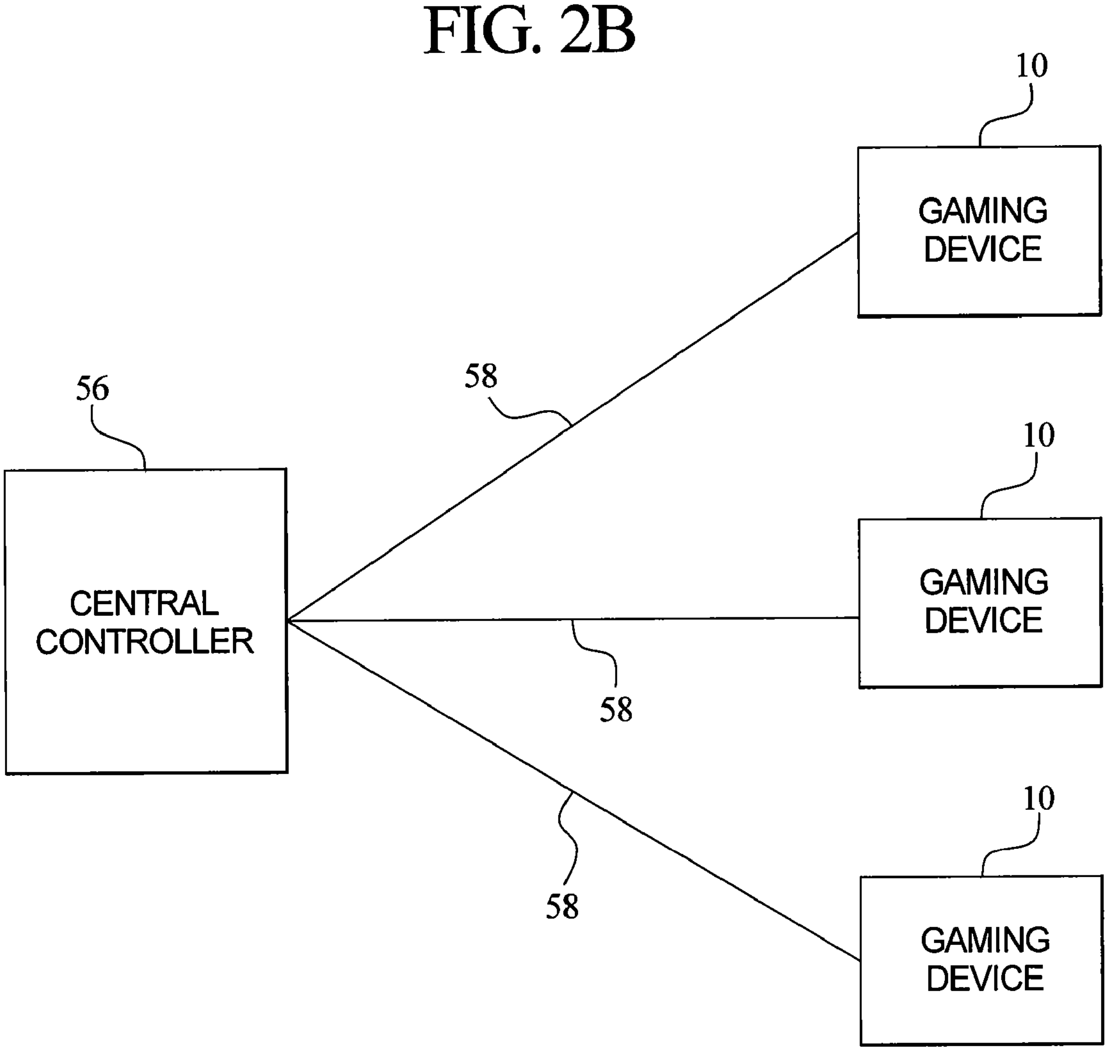
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system hot site computer) determines when a progressive award win is triggered. In another embodiment, an individual gaming machine and a central controller (or progressive gaming system hot site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

The reel or slot game disclosed herein can be provided to the player as a primary or base game or as a secondary or bonus game. If the reel or slot game is provided as a secondary game, then the gaming device can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

If the reel game of the gaming device disclosed herein is incorporated as a primary or base game then in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Regardless of if the reel or slot game of the gaming device disclosed herein is incorporated as a primary or base game or as a secondary or bonus game, the reel or slot game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of symbol generators or reels 54, such as the five reels illustrated in FIGS. 1A and 1B. The symbol generators or reels are in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels are in video form, the plurality of simulated video reels are displayed on one or more of the display devices as described above. In another embodiment, one or more of the reels are independent reels or unisymbol reels. In this embodiment, each independent or unisymbol reel generates and displays one symbol to the player. Each reel displays a plurality of indicia or symbols 62 such as bells, hearts, fruits, numbers, letters, bars or other images which preferably correspond to one or more themes associated with the gaming device.

Supplemental Payline Embodiments

Figure 3:
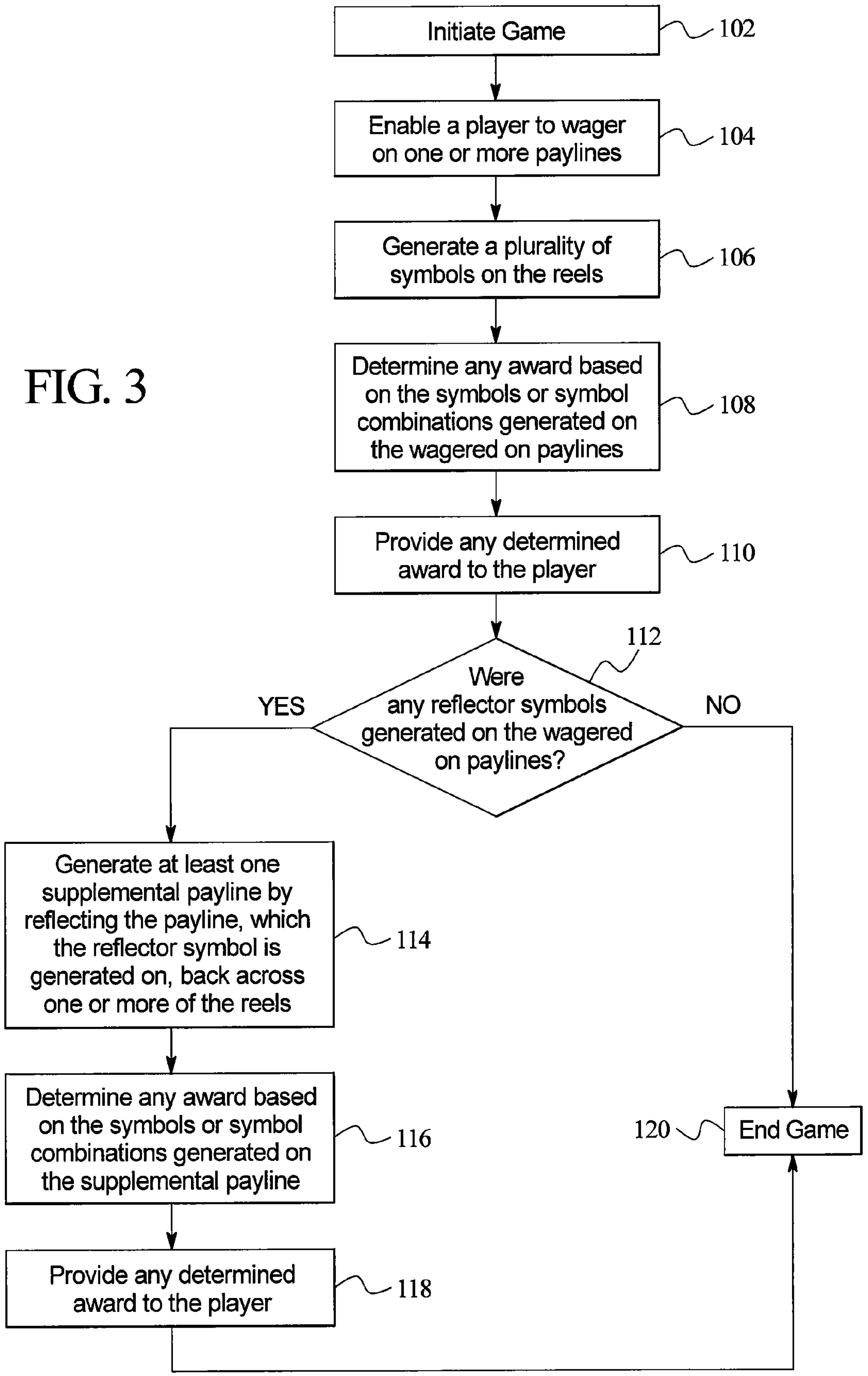
FIG. 3 is a flowchart of one embodiment of the gaming device disclosed herein illustrating the generation of a reflector symbol and the formation of a supplemental payline.

Referring now to FIG. 3, in one embodiment, the gaming device initiates a game and enables a player to wager on one or more of the paylines as indicated in blocks 102 and 104. Each wagered on payline is activated. In one embodiment, the player's wager activates a plurality of paylines. In different embodiments, the number of paylines activated are based on the player's wager, predetermined, randomly determined, determined based on the player's wager in a primary game (if this slot game is provided in a secondary game), determined based on the player's status (e.g., determined through a player tracking system), determined from the occurrence of one or more symbols in a primary game (if this slot game is provided in a secondary game) or determined based on any other suitable method.

After wagering on the paylines, the gaming device generates and displays a plurality of symbols on the reels and determines any award based on the symbols or symbol combinations generated on the wagered on paylines as indicated in blocks 106 and 108. The gaming device provides any determined award to the player as indicated in block 110.

In addition to determining any award based on the symbols generated on the wagered on paylines, the gaming device determines if any reflector symbols were generated on the wagered on paylines as indicated in diamond 112. As described below, a reflector symbol is a symbol that, when generated on one of the reels, causes any payline which runs through such reflector symbol to be reflected from the generated reflector symbol to at least one supplemental symbol location. If at least one reflector symbol is generated on at least one of the wagered on paylines, in this example, the gaming device generates and displays at least one supplemental payline by reflecting the wagered on payline (which the reflector symbol is generated on) back across one or more of the reels (or symbol locations) as indicated in block 114. In other words, in this embodiment, the generated reflector symbol causes the wagered on payline which intersects the generated reflector symbol to reflect back across one, more or each of the reels to form at least one supplemental or extra payline. The supplemental payline extends from the reflector symbol at a different angle and in a different path or direction than the wagered on payline (or a part of the wagered on payline) which the gaming device generated the reflector symbol on.

In one embodiment, the supplemental payline is reflected back across one or more of the reels which the payline previously passed through. In one embodiment, the supplemental payline passes through at least one other symbol or symbol position which passes through the wagered on payline. In one embodiment, the supplemental payline does not pass through any other symbols or symbol positions which pass through the wagered on payline. In one embodiment, the supplemental payline must be separately wagered on for the reflector symbol to function as described above. It should be appreciated that more than one or multiple supplemental paylines may be caused to be formed by the generation of a reflector symbol or multiple reflector symbols. In different embodiments, the number of supplemental paylines generated from the occurrence of a reflector symbol may be predetermined, randomly determined, based on the player's wager (i.e., the higher the wager, the greater the number of supplemental paylines), based on the player's status (e.g., determined through a player tracking system) or based on any other suitable manner.

In another embodiment, the supplemental payline reflects from the generated reflector symbol up or down the same reel column which generated the reflector symbol. For example, if each symbol position is a unisymbol or independent reel adapted to generate symbols independently of each of the other symbol positions, the formation of a supplemental payline in a vertical direction is equivalent to the formation of a supplemental payline in a horizontal or diagonal direction. In another embodiment, the supplemental payline is reflected from the generated reflector symbol up or down the same reel column which generated the reflector symbol and then back across one or more of the reels. In another embodiment, the supplemental payline extends up or down the same reel column which generated the reflector symbol and then forward across one or more of the reels.

In another embodiment, if at least one reflector symbol is generated on at least one of the wagered on paylines, the gaming device generates and displays a plurality of supplemental paylines by reflecting the wagered on payline (which the reflector symbol is generated on) back across one or more reels to a plurality of supplemental symbol locations. In one embodiment, the plurality of formed supplemental paylines correspond with a plurality of the base paylines which intersect with the symbol position where the reflector symbol was generated. In another embodiment, the plurality of formed supplemental paylines correspond with each of the base paylines which intersect with the symbol position where the reflector symbol was generated. In one embodiment, the formed supplemental paylines run forward along each of the base paylines which intersect the symbol position where the reflector symbol was generated. In another embodiment, the formed supplemental paylines run back along each of the base paylines which intersect the symbol position where the reflector symbol was generated. For example, if the reflector symbol is generated at a symbol position where six base paylines run through, then the gaming device will form six supplemental paylines which travel back along each of the six base paylines which the reflector symbol ran through.

In one embodiment, if a plurality of reflector symbols are generated, the gaming device generates and displays a supplemental payline for one of the generated reflector symbols. In another embodiment, if a plurality of reflector symbols are generated, the gaming device generates and displays an individual supplemental payline for a plurality of or each reflector symbol generated on a wagered on payline.

After forming and displaying one or more supplemental paylines based on any reflector symbols generated on any wagered on paylines, the gaming device determines if an award is associated with any of the symbols or symbol combinations generated on the formed supplemental payline as indicated in block 116 of FIG. 3. If an award is associated with any of the symbols or symbol combinations generated on the supplemental payline, the determined award is provided to the player as indicated in block 118. After providing the player any award determined based on the symbols generated on the supplemental payline or if no reflector symbol is generated on the wagered on payline, the game ends as indicated in block 120.

Figure 4A:
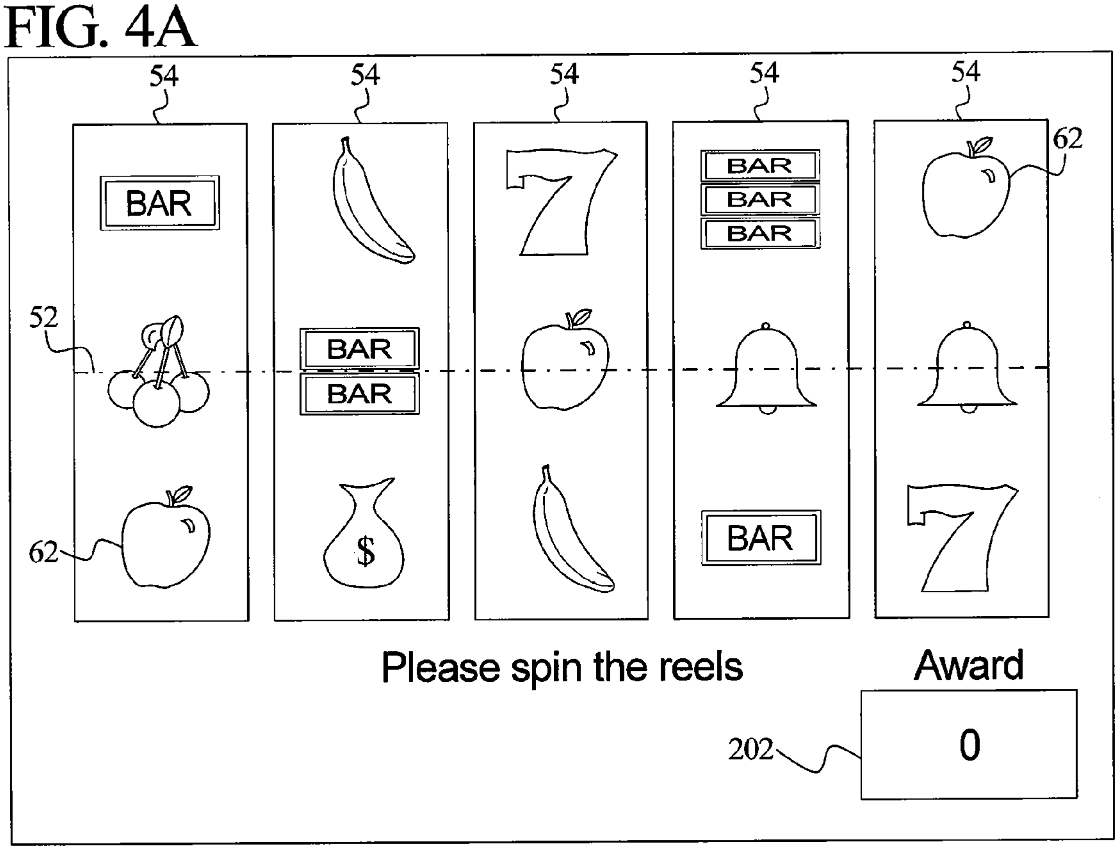
FIGS. 4A, 4B and 4C are front elevational views of one embodiment of the gaming device disclosed herein illustrating the generation of a reflector symbol, the formation of a supplemental payline and an award provided to a player based on the symbols generated on the supplemental payline.

Referring now to FIG. 4A, in one embodiment, upon a suitable triggering event, such as a player wagering on one or more paylines to activate such paylines, a play of the game is initiated and the plurality of symbol generators or reels 54 are displayed. The plurality of symbol generators include a plurality of symbols 62 including at least one reflector symbol. Appropriate messages such as "PLEASE SPIN THE REELS" may be provided to the player visually, or through suitable audio or audiovisual displays.

In one embodiment, the gaming device includes at least one symbol designated as a reflector symbol. In another embodiment, the gaming device includes a plurality of symbols designated as reflector symbols. In one embodiment, a plurality of the reels each include at least one symbol designated as a reflector symbol. In another embodiment, a plurality of the reels each include a plurality of symbols designated as reflector symbols. In another embodiment, each of the reels includes at least one symbol designated as a reflector symbol. In another embodiment, each of the reels includes a plurality of symbols designated as reflector symbols.

In different embodiments, the number of symbols designated as reflector symbols on the reels is predetermined, randomly determined, determined based on the player's wager, determined based on the player's status (e.g., determined through a player tracking system), determined from the occurrence of one or more symbols or determined based on any other suitable method. In different embodiments, the location of each reflector symbol on the reels is predetermined, randomly determined, determined based on the player's wager, determined based on the player's status (e.g., determined through a player tracking system), determined from the occurrence of one or more symbols or determined based on any other suitable method.

Figure 4B:
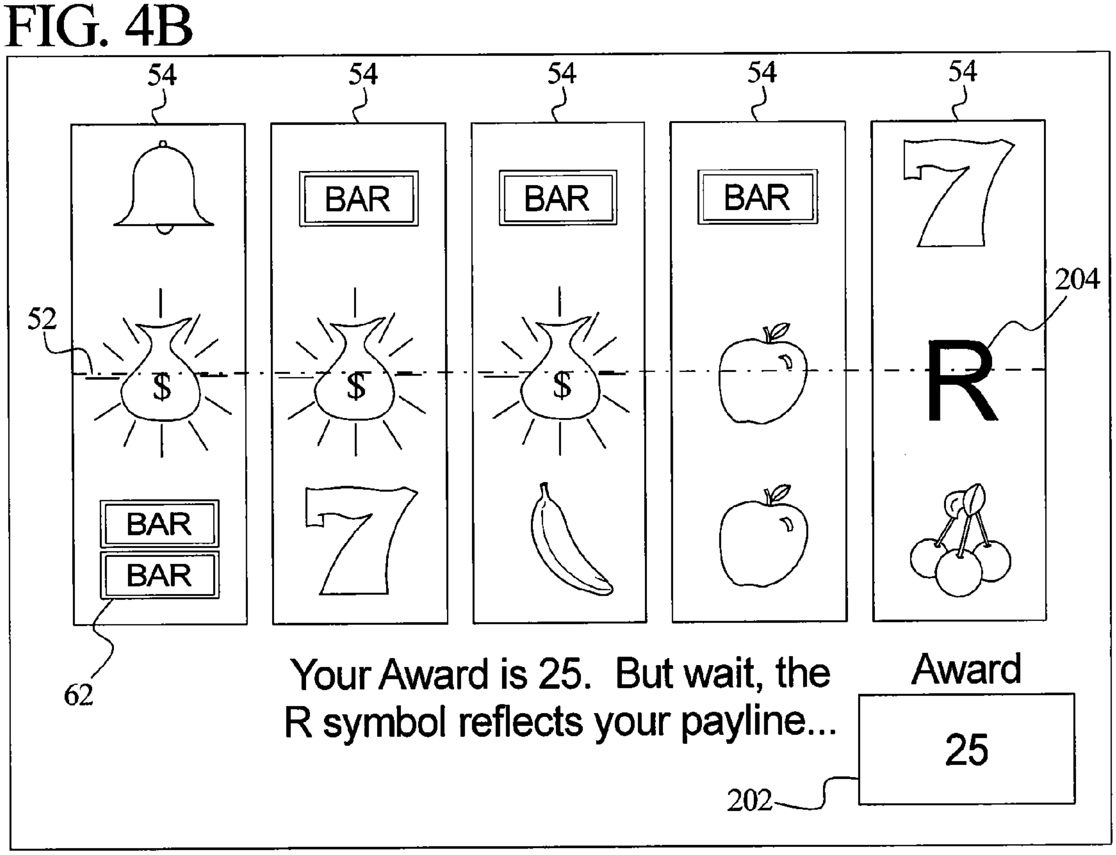

As illustrated in FIG. 4B, either automatically or in response to a player input, the reels are activated to generate a plurality of symbols. The gaming device determines any suitable award associated with any symbol or symbol combination generated on the wagered on or active payline. In this example, the gaming device determined that an award of twenty-five is associated with the symbol combination of three adjacent money bag symbols on the active payline 52. Accordingly, the determined award of twenty-five is provided to the player as displayed in the award display 202.

In addition to determining and providing the player any award based on the symbols or symbol combinations generated on the wagered on payline, the gaming device determines if at least one reflector symbol was generated on the wagered on payline. In this example, the gaming device determined that the gaming device generated a reflector symbol 204 (illustrated as an "R") on the wagered on payline 52. Appropriate messages such as "YOUR AWARD IS 25" and "BUT WAIT, THE R SYMBOL REFLECTS YOUR PAYLINE . . . " may be provided to the player visually, or through suitable audio or audiovisual displays.

Figure 4C:
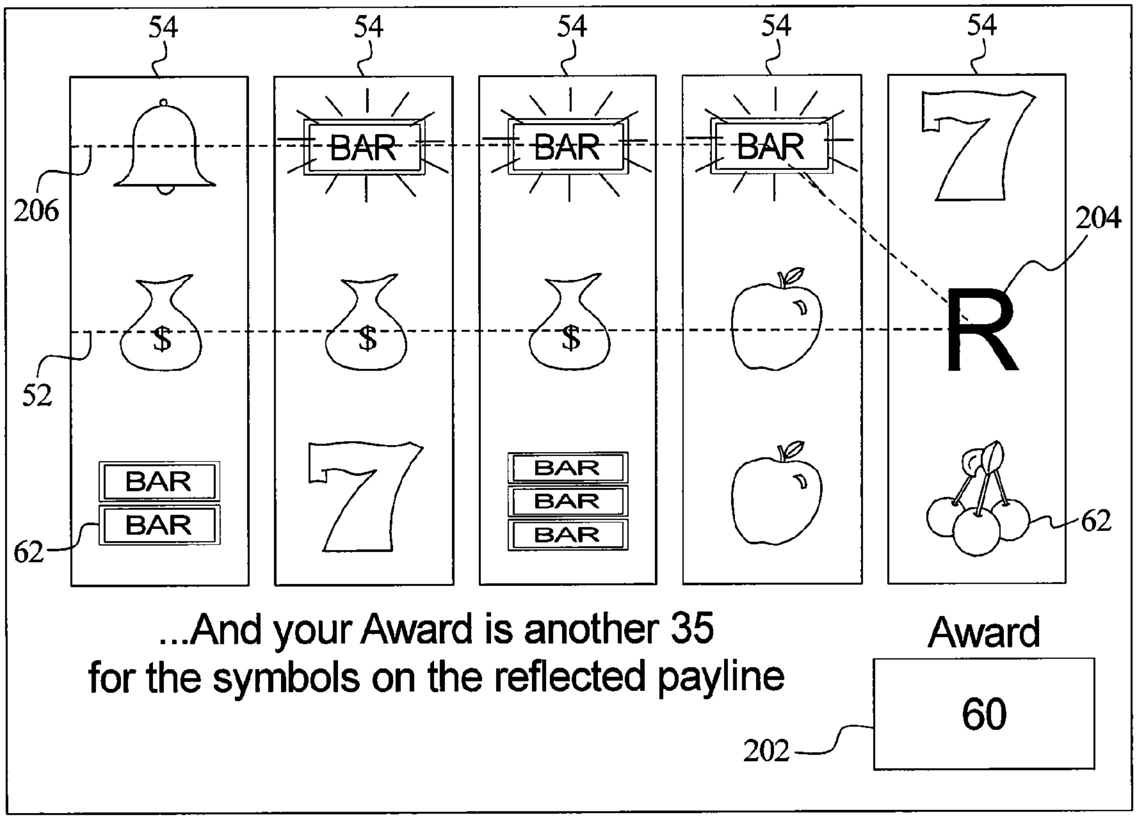

As illustrated in FIG. 4C, as the gaming device generated a reflector symbol on the wagered on payline, the gaming device forms and displays a supplemental payline 206 by reflecting the wagered on payline which the reflector symbol was generated on back across one or more reels. In this example, the gaming device reflects the supplemental payline back across each of the reels the wagered on payline ran through. The gaming device determines any suitable award associated with any symbol or symbol combination generated on the formed supplemental payline. The gaming device may determine the award by evaluating the generated symbol or symbol combinations generated on the formed supplemental payline in a right-to-left fashion, a left-to-right fashion or a scatter pay fashion. In this example, the gaming device determined that an award of thirty-five is associated with the symbol combination of three adjacent single bar symbols generated on the formed supplemental payline. Accordingly, the determined award of thirty-five is provided to the player. The gaming device determines and displays in the award display a total award of sixty, based on the award of twenty-five for the symbols generated on the initially wagered on payline 52 and the award of thirty-five for the symbols generated on the formed supplemental payline 206. Appropriate messages such as " . . . AND YOUR AWARD IS ANOTHER 35 FOR THE SYMBOLS ON THE REFLECTED PAYLINE" may be provided to the player visually, or through suitable audio or audiovisual displays.

In one embodiment, the supplemental payline extends back across a plurality of the reels. In another embodiment, the supplemental payline extends back across each of the reels. In different embodiments, the number of reels the supplemental payline extends back is predetermined, randomly determined, determined from the occurrence of one or more symbols, determined based on the player's status (e.g., determined through a player tracking system), or determined based on any other suitable method. In one embodiment, the number of reels the supplemental payline extends back is determined based on the player's wager. For example, in this embodiment, the greater the player's wager, the greater number of reels the supplemental paylines extends back and thus the larger award which may be provided to the player.

In one embodiment, as illustrated in FIGS. 4A to 4C, one supplemental payline is formed and reflected back based on the generated reflector symbol. In another embodiment, a plurality of supplemental paylines are formed and reflected back based on the generated reflector symbol. For example, one supplemental payline may be formed in the row of symbol positions above the generated reflector symbol and another supplemental payline may be formed in the row of symbol positions below the generated reflector symbol. In different embodiments, the number of supplemental paylines formed from each generated reflector symbol is predetermined, randomly determined, determined based on the player's wager, determined based on the player's status (e.g., determined through a player tracking system), determined from the occurrence of one or more symbols or determined based on any other suitable method.

Figure 5A:
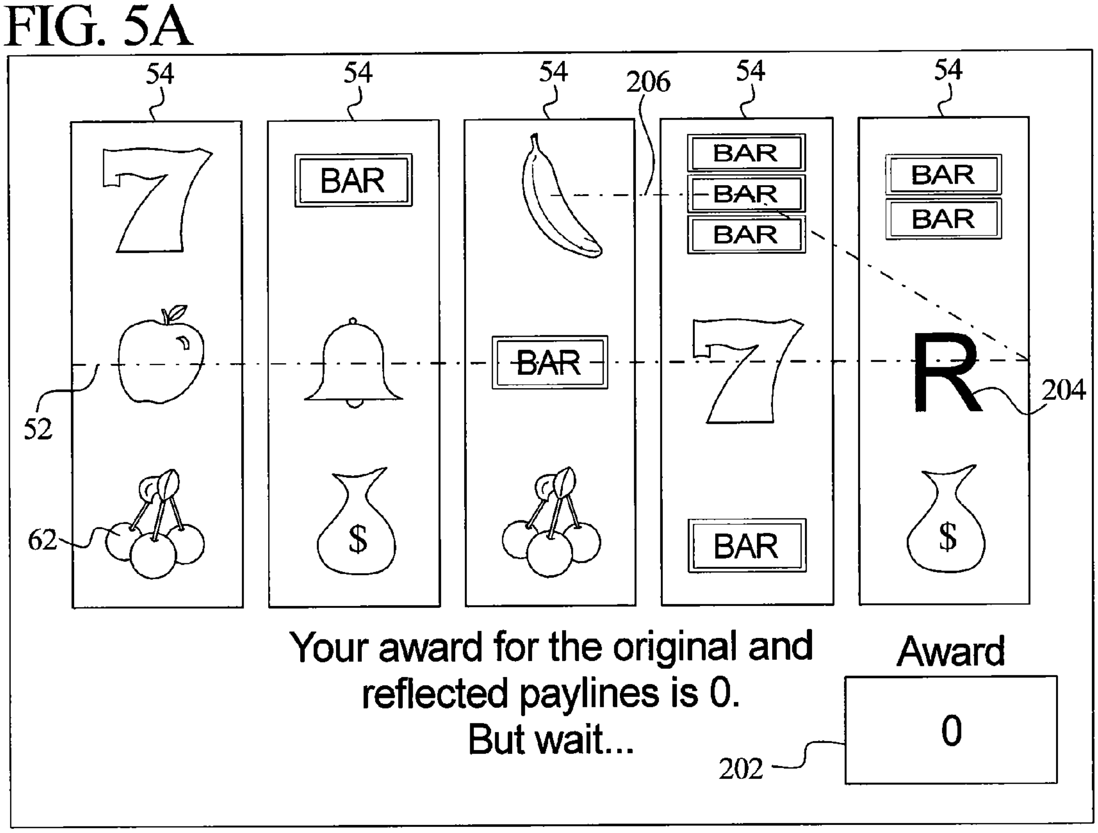
FIGS. 5A, 5B and 5C are front elevational views of one embodiment of the gaming device disclosed herein illustrating the generation of a reflector symbol, the formation of a supplemental payline, the respinning of one of the reels and an award provided to a player based on the new symbols generated on the supplemental payline.

FIG. 5A illustrates another embodiment after the gaming device generated a reflector symbol 204 on a wagered on payline and the reflector symbol caused the wagered on payline to reflect back across some, but not all of the plurality of reels to form a supplemental payline 206. As described above, the gaming device determines any award based on the symbols or combinations of symbols generated on the wagered on payline or the formed supplemental payline. In this example, no award is provided to the player based on the symbols or combinations of symbols generated on the wagered on payline or the formed supplemental payline. In addition to determining any award based on the symbols or combinations of symbols generated on the wagered on payline or the formed supplemental payline, the gaming device determines whether to regenerate symbols on one or more of the plurality of reels. Appropriate messages such as "YOUR AWARD FOR THE ORIGINAL PAYLINE AND THE REFLECTED PAYLINE IS 0" and "BUT WAIT . . . " may be provided to the player visually, or through suitable audio or audiovisual displays.

Figure 5B:
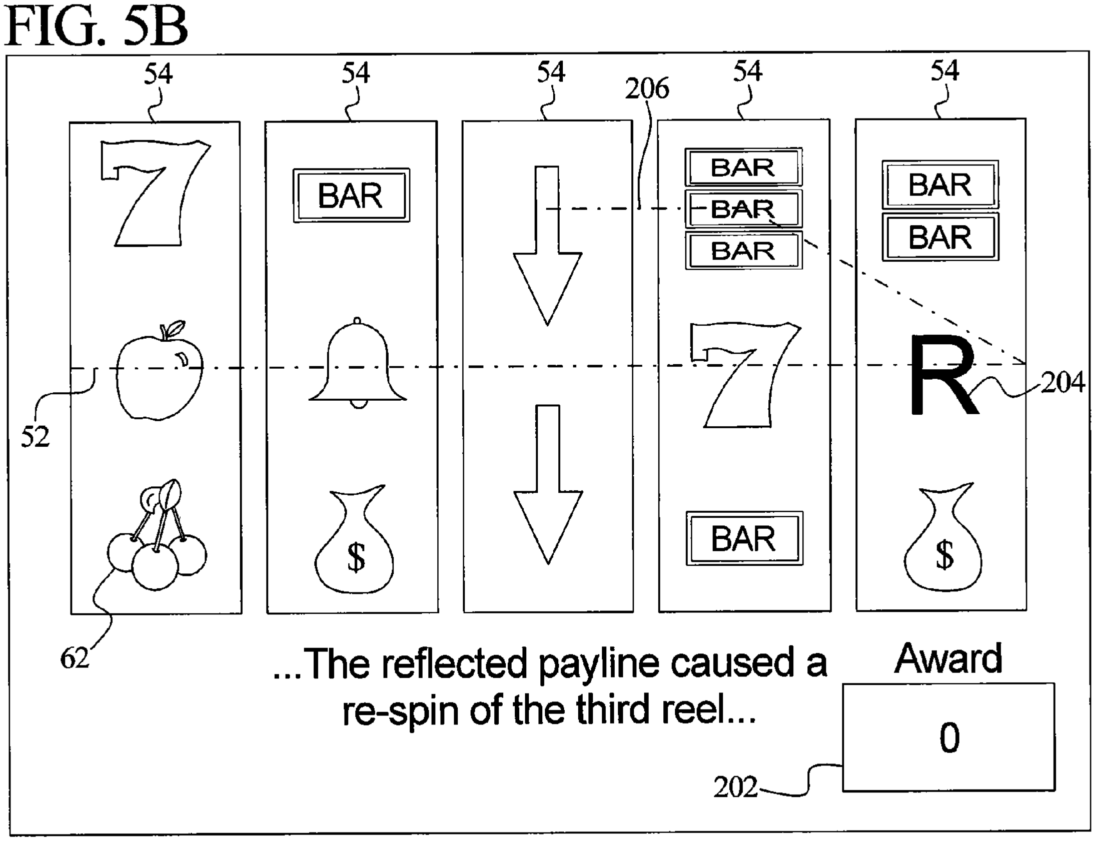

In this embodiment, as illustrated in FIG. 5B, the gaming device determined to respin the reel which the formed supplemental payline reflects back or otherwise extends to. Accordingly, the third reel is respun to generate another plurality of symbols. Appropriate messages such as "THE REFLECTED PAYLINE CAUSED A RESPIN OF THE THIRD REEL" may be provided to the player visually, or through suitable audio or audiovisual displays.

Figure 5C:
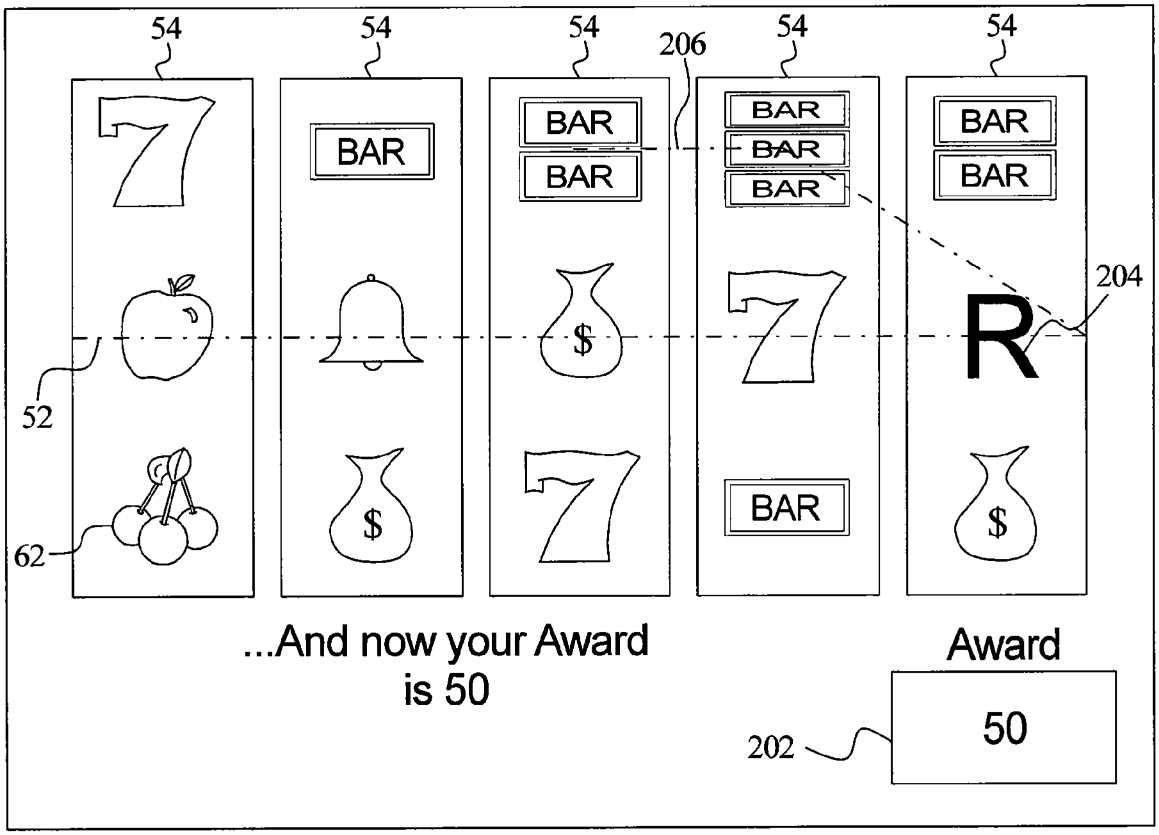

As illustrated in FIG. 5C, after generating symbols on the respun third reel, the gaming device determines any suitable award associated with any symbol or symbol combination generated on the initially wagered on payline and/or the formed supplemental payline. This determination is based on the initially generated symbols on the first, second, fourth and fifth reels and the new symbols generated on the third reel. In this example, the gaming device determines an award of fifty and provides the determined award to the player. Appropriate messages such as "AND NOW YOUR AWARD IS 50" may be provided to the player visually, or through suitable audio or audiovisual displays.

In one embodiment, as described above, the gaming device causes the reel which the supplemental payline reaches and does not extend past to respin. In another embodiment, the gaming device causes one or more of the reels which the supplemental payline reaches and extends past to respin. In another embodiment, the gaming device causes each of the reels which the supplemental payline reaches to respin. In another embodiment, if a designated symbol is generated on one of the reels and the supplemental payline intersects the designated symbol, the gaming device respins the reel which the designated symbol was generated on. In different embodiments, the reel(s) which are respun are predetermined, randomly determined, determined based on the player's wager, determined based on the player's status (e.g., determined through a player tracking system), determined from the occurrence of one or more symbols or determined based on any other suitable method.

In one embodiment (not shown), if another reflector symbol is generated on the formed supplemental payline, the gaming device is adapted to reflect that formed supplemental payline back to form at least another supplemental payline. In another embodiment, if another reflector symbol is generated on the formed supplemental payline, the supplemental payline is modified, although not reflected back, to account for the additional reflector symbol. In another embodiment, if another reflector symbol is generated on the formed supplemental payline, that reflector symbol has no effect and does not modify the formed supplemental payline. In one alternative embodiment, the generated reflector symbol functions as a wild symbol. In another alternative embodiment, the generated reflector symbol functions as a multiplier.

Figure 6A:
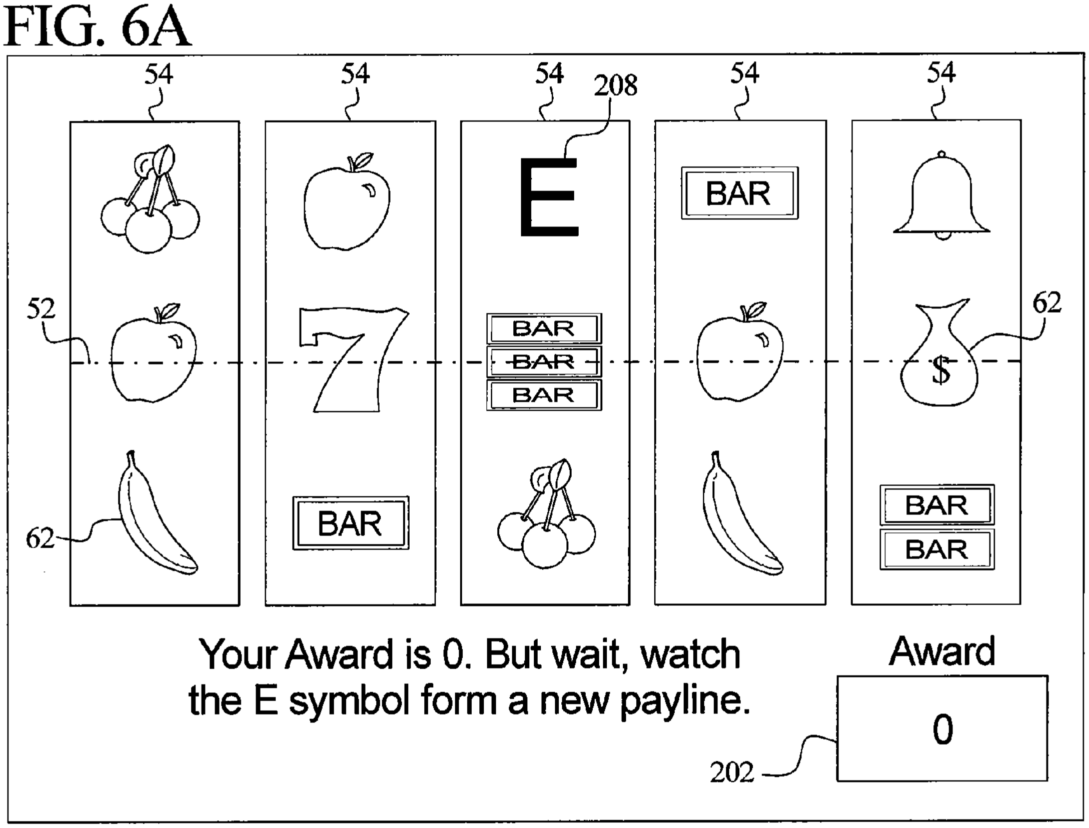
FIGS. 6A and 6B are front elevational views of one embodiment of the gaming device disclosed herein illustrating the generation of an emanator symbol, the formation of a supplemental payline from the emanator symbol and an award provided to a player based on the symbols generated on the supplemental payline.
Figure 6B:
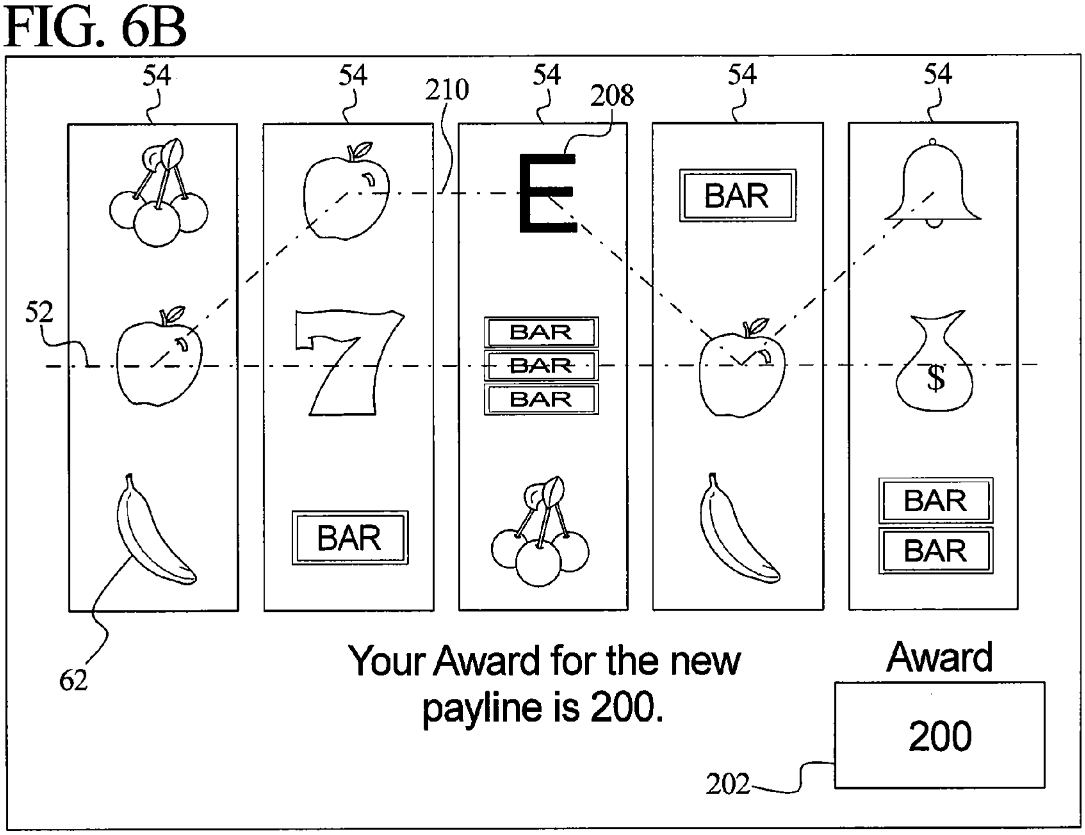

Referring now to FIGS. 6A and 6B, in another embodiment, at least one and preferably a plurality of the symbols on the reels are emanator symbols. An emanator symbol is a symbol that, when generated on one of the reels, causes one or more supplemental paylines to emanate in one or more directions from the generated emanator symbol to one or more symbol positions on one or more of the reels.

In one embodiment, the gaming device includes at least one symbol designated as an emanator symbol. In another embodiment, the gaming device includes a plurality of symbols designated as emanator symbols. In one embodiment, a plurality of the reels each include at least one symbol designated as an emanator symbol. In another embodiment, a plurality of the reels each include a plurality of symbols designated as emanator symbols. In another embodiment, each of the reels includes at least one symbol designated as an emanator symbol. In another embodiment, each of the reels includes a plurality of symbols designated as emanator symbols.

In different embodiments, the number of symbols designated as emanator symbols on the reels is predetermined, randomly determined, determined based on the player's wager, determined based on the player's status (e.g., determined through a player tracking system), determined from the occurrence of one or more symbols or determined based on any other suitable method. In different embodiments, the location on the reels of each emanator symbol on the reels is predetermined, randomly determined, determined based on the player's wager, determined based on the player's status (e.g., determined through a player tracking system), determined from the occurrence of one or more symbols or determined based on any other suitable method.

FIG. 6A illustrates one embodiment after the gaming device generated a plurality of symbols on the reels and the gaming device determined an award of zero based on the symbols generated on the wagered on payline. In this embodiment, after determining any awards based on the generated symbols on the wagered on paylines, the gaming device determines if at least one emanator symbol is generated on at least one of the activated paylines. In this example, the gaming device determined that an emanator symbol 208 (as illustrated with an "E") was generated on one of the reels. Appropriate messages such as "YOUR AWARD IS O" and "BUT WAIT, WATCH THE 'E' SYMBOL FORM A NEW PAY- LINE" may be provided to the player visually, or through suitable audio or audiovisual displays.

As illustrated in FIG. 6B, as at least one emanator symbol is generated on the reels, one or more supplemental paylines 210 emanate from the generated emanator symbol. The supplemental paylines extend from the generated emanator symbol across one or more adjacent reels to form one of a plurality of different patterns. After forming one or more supplemental paylines based on the generation of one or more emanator symbols, the gaming device determines any award based on the symbols or combinations of symbols generated on the supplemental payline and provides any determined award to the player. In this case, the gaming device determines that the symbol combination generated along the formed supplemental payline is associated with an award of two-hundred and the gaming device provides this determined award to the player. Appropriate messages such as "YOUR AWARD FOR THE NEW PAYLINE IS 200" may be provided to the player visually, or through suitable audio or audiovisual displays.

In one alternative embodiment, if at least one emanator symbol is generated on one of the wagered on paylines, a plurality of supplemental paylines emanate from the generated emanator symbol in different directions. In different embodiments, the number of supplemental paylines which emanate from each generated emanator symbol are predetermined, randomly determined, determined based on the player's wager, determined based on the player's status (e.g., determined through a player tracking system), determined from the occurrence of one or more symbols or determined based on any other suitable method. In other embodiments, the path and direction of each supplemental payline which emanates from a generated emanator symbol are predetermined, randomly determined, determined based on the player's wager, determined based on the player's status (e.g., determined through a player tracking system), determined from the occurrence of one or more symbols or determined based on any other suitable method.

In another embodiment, the supplemental payline emanates from the generated emanator symbol up or down the same reel column which generated the emanator symbol. For example, if each symbol position is a unisymbol or independent reel adapted to generate symbols independently of each of the other symbol positions, a formation of the supplemental payline in a vertical direction is equivalent to a formation of the supplemental payline in a horizontal or diagonal direction. In another embodiment, the supplemental payline emanates from the generated emanator symbol up or down the same reel column which generated the emanator symbol and then back across one or more of the reels. In one embodiment, the supplemental payline must be separately wagered on for the emanator symbol to function as described above.

In an alternative embodiment (now shown), the gaming device emanates one or more paylines from a randomly determined symbol position, regardless of any generation of an emanator symbol. In another embodiment, the gaming device emanates one or more paylines from a predetermined symbol position, regardless of any generation of an emanator symbol. In one alternative embodiment, the generated emanator symbol functions as a wild symbol. In another alternative embodiment, the generated emanator symbol functions as a multiplier.

Figure 7A:
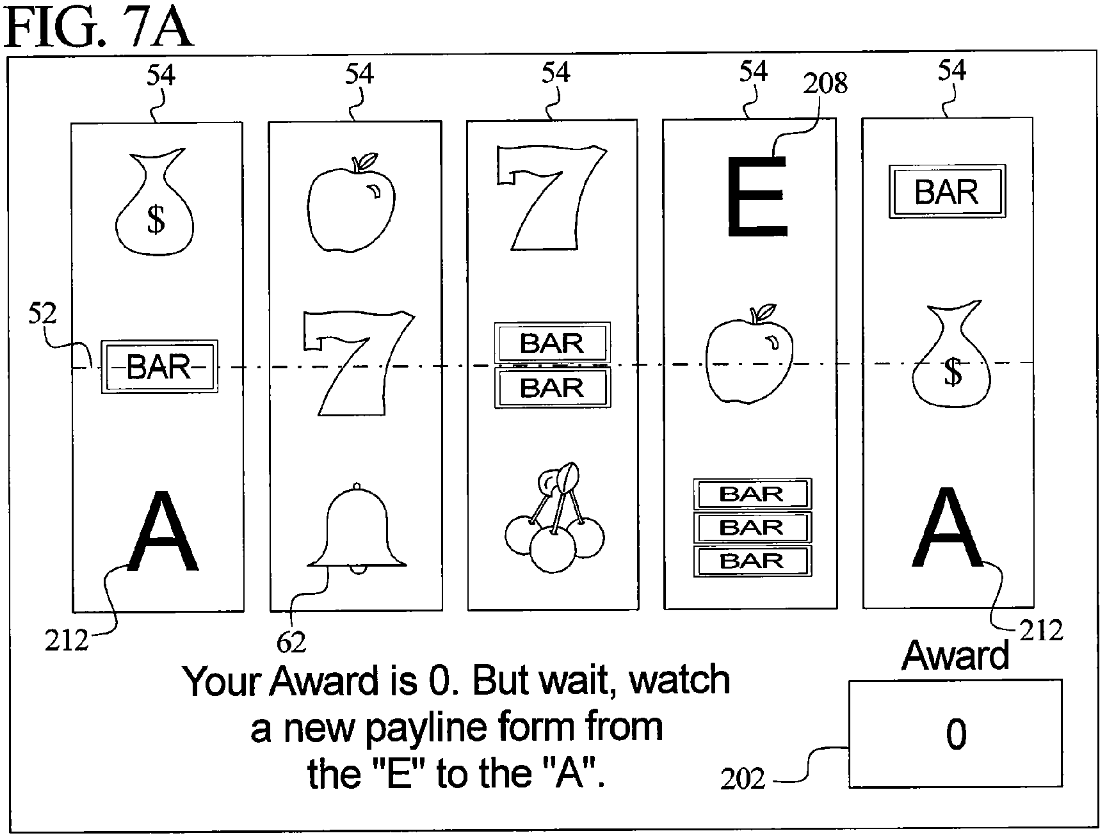
FIGS. 7A and 7B are front elevational views of one embodiment of the gaming device disclosed herein illustrating the generation of an emanator symbol and an attractor symbol, the formation of a supplemental payline from the emanator symbol to the attractor symbol and an award provided to a player based on the symbols generated on the supplemental payline.
Figure 7B:
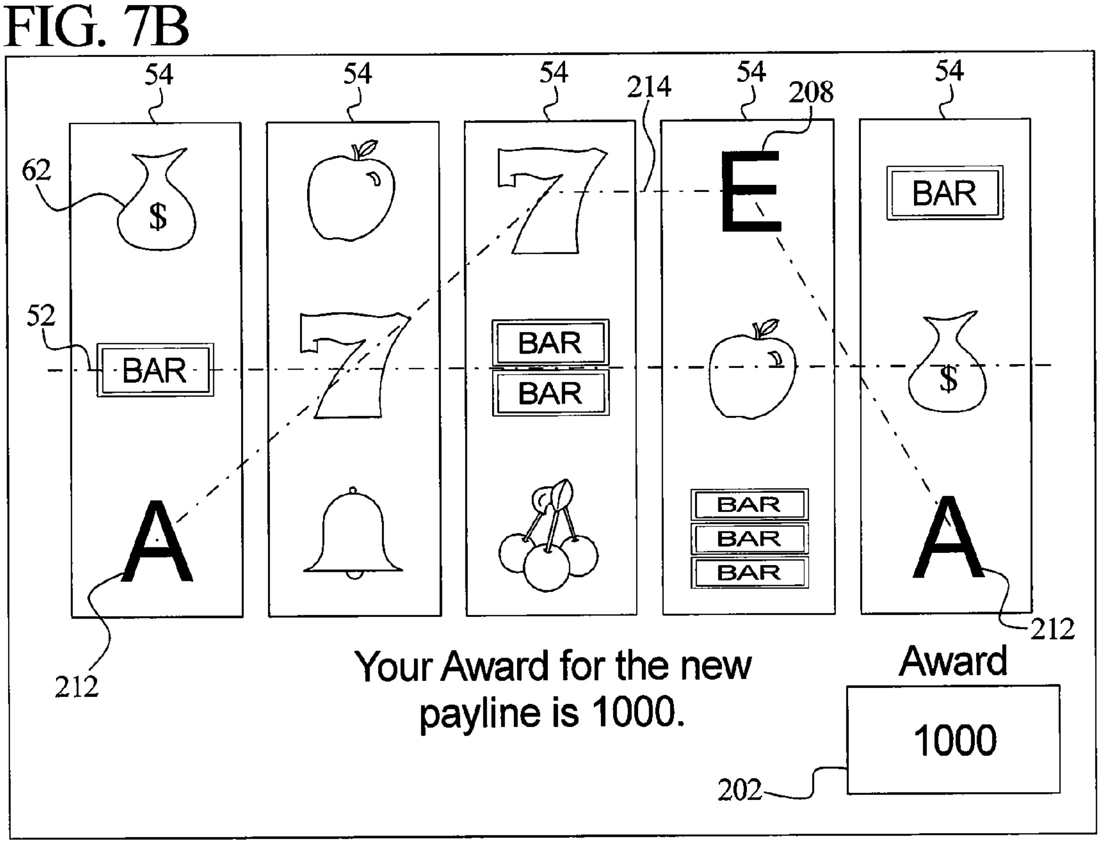
Figure 8A:
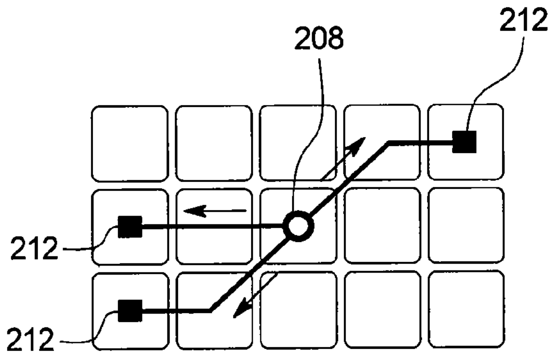
FIGS. 8A, 8B, 8C, 8D and 8E are front elevational views of alternative embodiments of the gaming device disclosed herein illustrating the generation of one or more emanator symbols, one or more attractor symbols and the formation of one or more supplemental paylines.
Figure 8B:
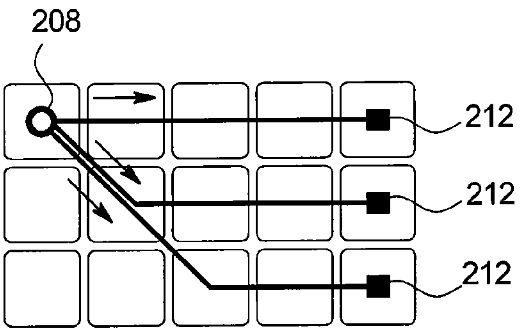
Figure 8C:
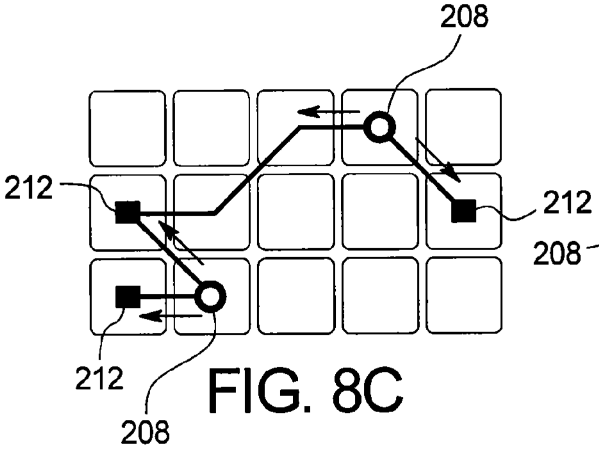
Figure 8D:
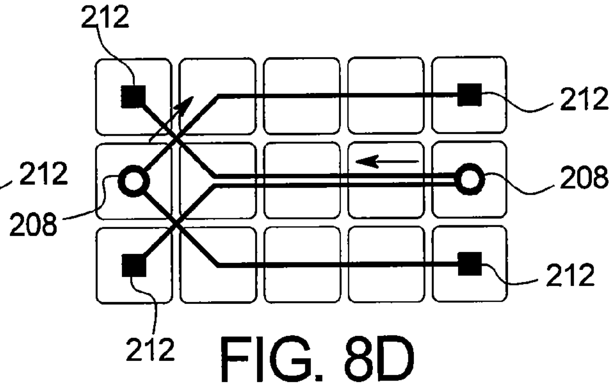
Figure 8E:
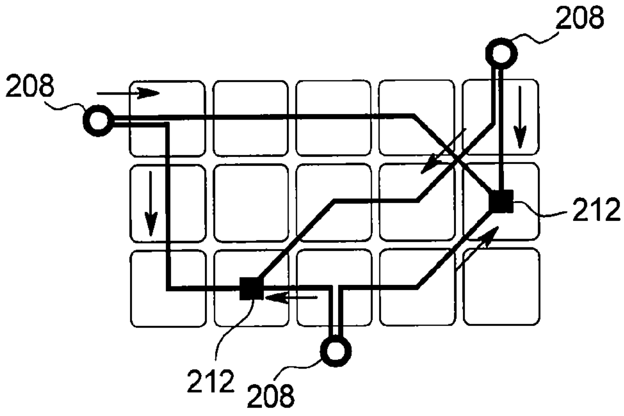

Referring to FIGS. 7A and 7B, in another embodiment, at least one and preferably a plurality of the symbols are emanator symbols and at least one and preferably a plurality of the symbols are attractor symbols. As described above, an emanator symbol is a symbol that when generated on one of the reels, causes one or more supplemental paylines to emanate in one or more directions from the generated emanator symbol to one or more symbol positions on one or more of the reels. An attractor symbol is a symbol that, when generated on one of the reels, causes one or more supplemental paylines to emanate from the generated emanator symbol to the generated attractor symbol.

In one embodiment, the gaming device includes at least one symbol designated as an attractor symbol. In another embodiment, the gaming device includes a plurality of symbols designated as attractor symbols. In one embodiment, a plurality of the reels each include at least one symbol designated as an attractor symbol. In another embodiment, a plurality of the reels each include a plurality of symbols designated as attractor symbols. In another embodiment, each of the reels includes at least one symbol designated as an attractor symbol. In another embodiment, each of the reels includes a plurality of symbols designated as attractor symbols.

In different embodiments, the number of symbols designated as attractor symbols on the reels is predetermined, randomly determined, determined based on the player's wager, determined based on the player's status (e.g., determined through a player tracking system), determined from the occurrence of one or more symbols or determined based on any other suitable method. In different embodiments, the location of each attractor symbol on the reels is predetermined, randomly determined, determined based on the player's wager, determined based on the player's status (e.g., determined through a player tracking system), determined from the occurrence of one or more symbols or determined based on any other suitable method.

FIG. 7A illustrates one embodiment after the gaming device generated a plurality of symbols on the reels and the gaming device determined an award of zero based on the symbols generated on the wagered on payline. In this embodiment, after determining any awards based on the generated symbols on the wagered on paylines, the gaming device determines if at least one emanator symbol or at least one attractor symbol are generated. In this example, the gaming device determined that an emanator symbol 208 (as illustrated with an "E") and two attractor symbols 212 (as each illustrated with an "A") were both generated. It should be appreciated that in this embodiment, the designated emanator symbols and designated attractor symbols do not need to be generated on a wagered on payline to function. Appropriate messages such as "YOUR AWARD IS O" and "BUT WAIT, WATCH THE A NEW PAYLINE FORM FROM THE 'E' SYMBOL TO THE 'A' SYMBOL" may be provided to the player visually, or through suitable audio or audiovisual displays.

As illustrated in FIG. 7B, as an emanator symbol was generated on the fourth reel and attractor symbols were generated on the first and fifth reels, a supplemental payline 214 will emanate from the generated emanator symbol and extend to each of the generated attractor symbols. After forming one or more supplemental paylines based on the generation of any emanator symbols and any attractor symbols, the gaming device determines any award based on the symbols or combinations of symbols generated on the supplemental payline and provides any determined award to the player. It should be appreciated that in this embodiment, the attractor symbols function as wild symbols and thus the player is provided the award of one-thousand associated with three adjacent "seven" symbols generated on the supplemental payline on the first, second and third reels. Appropriate messages such as "YOUR AWARD FOR THE NEW PAYLINE IS 1000" may be provided to the player visually, or through suitable audio or audiovisual displays.

In one alternative embodiment with attractor symbols, if an emanator symbol is generated and no attractor symbol is generated, no supplemental payline will emanate from the generated emanator symbol. In another embodiment, if no emanator symbols are generated and at least one attractor symbols is generated, no supplemental paylines will form, but an existing wagered on payline may be modified or moved to run through the generated attractor symbol. In another alternative embodiment, the generated attractor symbol functions as a multiplier.

In an alternative embodiment, a plurality of supplemental paylines form from one generated emanator symbol to a plurality of generated attractor symbols. In another alternative embodiment, a plurality of supplemental paylines form from a plurality of generated emanator symbols to one generated attractor symbol. In another embodiment, a plurality of supplemental paylines form from a plurality of generated emanator symbols to a plurality of generated attractor symbols.

In one embodiment, one or more attractor symbols are associated with one or more emanator symbols and a supplemental payline is formed from the attractor symbols to the associated emanator symbols. In this embodiment, if an emanator symbol is generated and an attractor symbol is also generated, but the generated emanator symbol and the generated attractor symbols are not associated with one another, no supplemental payline will form from the generated emanator symbol to the generated attractor symbol.

In another embodiment, for a supplemental payline to form from a generated emanator symbol to a generated attractor symbol, the generated emanator symbol and the generated attractor symbol must be non-adjacent to one another. In one embodiment, the number of reels between the generated emanator symbol and the generated attractor symbol determines if a supplemental payline will form. In another embodiment, the number of reels the supplemental payline will extend is based on the player's wager. In one embodiment, the supplemental payline must be separately wagered on for the emanator symbol and/or the attractor symbol to function as described above.

FIGS. 8A to 8E illustrate alternative embodiments of the gaming device wherein one or more emanator symbols 208 (illustrated as round or circular symbols) are generated, one or more attractor symbols 212 (illustrated as square shaped symbols) are generated and of one or more supplemental paylines are formed.

In another embodiment (not shown), at least one and preferably a plurality of the symbols are repellor symbols. A repellor symbol is a symbol that, when generated on one of the reels, causes one or more supplemental paylines to repel away from the generated repellor symbol. In this embodiment, if a supplemental payline is in the path of encountering a generated repellor symbol, the supplemental payline is modified or otherwise detours around the repellor symbol to avoid intersecting with the generated repellor symbol.

In one embodiment, the gaming device includes at least one symbol designated as a repellor symbol. In another embodiment, the gaming device includes a plurality of symbols designated as repellor symbols. In one embodiment, a plurality of the reels each include at least one symbol designated as a repellor symbol. In another embodiment, a plurality of the reels each include a plurality of symbols designated as repellor symbols. In another embodiment, each of the reels includes at least one symbol designated as a repellor symbol. In another embodiment, each of the reels includes a plurality of symbols designated as repellor symbols.

In different embodiments, the number of symbols designated as repellor symbols on the reels is predetermined, randomly determined, determined based on the player's wager, determined based on the player's status (e.g., determined through a player tracking system), determined from the occurrence of one or more symbols or determined based on any other suitable method. In different embodiments, the location of each repellor symbol on the reels is predetermined, randomly determined, determined based on the player's wager, determined based on the player's status (e.g., determined through a player tracking system), determined from the occurrence of one or more symbols or determined based on any other suitable method. In one embodiment, the supplemental payline must be wagered on for the repellor symbol to function as described above.

In one embodiment, the gaming device moves one or more generated reflector symbols, one or more generated emanator symbols, one or more generated attractor symbols and/or one or more generated repellor symbols. In one embodiment, if the gaming device moves a reflector symbol, emanator symbol, attractor symbol or repellor symbol, the gaming device modifies any formed supplemental payline to account for the moved symbol. In another embodiment, rather than generating one or more reflector symbols, one or more emanator symbols, one of more attractor symbols and/or one or more repellor symbols on the reels, the reflector symbols, emanator symbols, attractor symbols and/or repellor symbols are generated outside of the reels and form supplemental paylines as described above.

In another embodiment, at least one and preferably a plurality of the symbols are designated as multi-function symbols. In this embodiment, if a multi-function symbol is generated, the gaming device selects whether to assign the characteristics of a reflector symbol, an emanator symbol, an attractor symbol or a repellor symbol to the generated multi-function symbol. For example, the first time a multi-function symbol is generated, the gaming device may determine that the generated multi-function symbol functions as an attractor symbol, while the second time the multi-function symbol is generated, the gaming device may determine that the generated multi-function symbol functions as a reflector symbol In different embodiments, the determination of which symbol the multi-function symbol will function as is predetermined, randomly determined, determined based on the player's wager, determined based on the player's status (e.g., determined through a player tracking system), determined from the occurrence of one or more symbols or determined based on any other suitable method. It should be appreciated that although described above in separate embodiments, the reflector symbols, emanator symbols, attractor symbols and repellor symbols may all be provided in one embodiment of the gaming device disclosed herein.

In one embodiment, the gaming device disclosed herein is employed in conjunction with one or more primary games. In this embodiment, the player must place one or more separate wagers for each separate symbol generation. In another embodiment, the game disclosed herein is employed in association with free spins or free activations of the symbol generators. In this embodiment, the player is provided a number of free spins or free activations of the symbol generators during which symbols are generated and the game proceeds until a predetermined number of free spins, such as zero, remain or a terminating event or condition occurs and the free spin mode or sequence ends. In one embodiment wherein a number of free spins are provided to a player, if a supplemental payline if formed, the supplemental payline remains active for one, a plurality or each of the remaining free spins. In different embodiments, the number of remaining free spins the formed supplemental payline remains active is predetermined, randomly determined, determined based on the player's wager, determined based on the player's status (e.g., determined through a player tracking system), determined from the occurrence of one or more symbols or determined based on any other suitable method.

It should be appreciated that while the gaming device disclosed herein is described in regards to a slot game, the gaming device disclosed herein can be implemented into any suitable type of game wherein a plurality of symbols are generated and any award is provided to the player based on the generated symbols or symbol combinations. In one embodiment illustrating a card game, a plurality of sets of cards are generated wherein each set of cards includes a plurality of cards. The gaming device provides any awards associated with the cards or card combinations for each set of cards. In this embodiment, if a designated symbol is associated with at least one of the generated cards (i.e., a reflector symbol, emanator symbol or attractor symbol associated with one of the generated cards), the gaming device forms and displays a supplemental payline which includes cards from a plurality of the sets of cards. For example, the supplemental payline may include two cards from a first set of generated cards, two cards from a second set of generated cards and one card from a third set of generated cards. The gaming device determines if any awards are associated with any of the cards or card combinations on the supplemental payline and provides any determined awards to the player.

It should be understood that various changes and modifications to the presently preferred embodiments described herein will be apparent to those skilled in the art. Such changes and modifications can be made without departing from the spirit and scope of the gaming device disclosed herein and without diminishing its intended advantages. It is therefore intended that such changes and modifications be covered by the appended claims.

The invention claimed is:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to control a play of a game by:

(a) enabling a player to wager on at least one payline associated with a plurality of symbol generators, each of said plurality of symbol generators associated with a plurality of symbol positions, said at least one payline forming a predetermined path along a plurality of the symbol positions;

(b) generating a plurality of symbols at said plurality of symbol positions;

(c) evaluating said symbols generated along the wagered on payline in a first direction to determine any award associated with any winning combination of said symbols generated along the wagered on payline;

(d) providing any determined award to the player;

(e) determining whether a reflector symbol is generated on the wagered on payline; and (f) if said reflector symbol is generated on the wagered on payline, prior to evaluating any symbols generated along any of the wagered on paylines in any other direction:

(i) forming and displaying a supplemental payline which extends back across a number of the symbol positions, wherein said supplemental payline extends back along a different path than the wagered on payline, (ii) determining any award associated with any winning combination of said symbols generated along the formed supplemental payline, and (iii) providing any determined award to the player.

2. The gaming device of claim 1, wherein said plurality of symbols includes a plurality of reflector symbols.

3. The gaming device of claim 1, wherein when executed by the at least one processor, said plurality of instructions cause the at least one processor to control the play of the game by forming a plurality of supplemental paylines if said reflector symbol is generated on the wagered on payline.

4. The gaming device of claim 3, wherein each supplemental payline extends back across a number of the symbol positions along a different path than the wagered on payline.

5. The gaming device of claim 1, wherein the number of symbol generators the supplemental payline extends back across is based on the player's wager.

6. The gaming device of claim 1, wherein when executed by the at least one processor, said plurality of instructions cause the at least one processor to control the play of the game by regenerating at least one of the symbols at least one of the symbol positions which the supplemental payline intersects.

7. The gaming device of claim 1, which includes a plurality of paylines.

8. A gaming device comprising:

at least one display device;

at least one input device;

at least one processor; and at least one memory device which stores a plurality of instructions, which when executed by the at least one processor, cause the at least one processor to operate with the at least one display device and the at least one input device to control a play of a game by:

(a) enabling a player to wager on at least one payline associated with a plurality of symbol generators, each of said plurality of symbol generators associated with a plurality of symbol positions, said at least one payline forming a predetermined path along a plurality of the symbol positions;

(b) generating a plurality of symbols at said plurality of symbol positions;

(c) determining any award associated with any winning combination of said symbols generated along the wagered on payline;

(d) providing any determined award to the player;

(e) determining whether an emanator symbol is generated; and (f) if said emanator symbol is generated:

(i) forming and displaying at least one supplemental payline, wherein each supplemental payline emanates from the generated emanator symbol to a number of the symbol positions, each supplemental payline emanates in a different path than the wagered on payline, and the path of each supplemental payline is formed regardless of the path of the wagered on payline, (ii) determining any award associated with any winning combination of said symbols generated along the formed supplemental payline, and (iii) providing any determined award to the player.

9. The gaming device of claim 8, wherein said plurality of symbols includes a plurality of emanator symbols.

10. The gaming device of claim 8, wherein when executed by the at least one processor, said plurality of instructions cause the at least one processor to control the play of the game by forming a plurality of supplemental paylines if said emanator symbol is generated.

11. The gaming device of claim 8, wherein when executed by the at least one processor, said plurality of instructions cause the at least one processor to control the play of the game by regenerating at least one of the symbols at least one of the symbol positions which the supplemental payline intersects.

12. The gaming device of claim 8, which includes a plurality of paylines.

13. A gaming device comprising:

at least one display device;

at least one input device;

at least one processor; and at least one memory device which stores a plurality of instructions, which when executed by the at least one processor, cause the at least one processor to operate with the at least one display device and the at least one input device to control a play of a game by:

(a) enabling a player to wager on a payline associated with a plurality of symbol generators, said plurality of symbol generators associated with a plurality of symbol positions;

(b) generating a plurality of symbols at the plurality of symbol positions;

(c) determining any award associated with any winning combination of said symbols generated along the wagered on payline;

(d) providing any determined award to the player;

(e) determining whether to form at least one supplemental payline; and (f) if the determination is to form at least one supplemental payline:

(i) independent from the generation of the symbols at the plurality of symbol positions, selecting one of the symbol positions, (ii) forming and displaying at least one supplemental payline, wherein each supplemental payline is formed in at least one direction from the selected symbol position to at least another one of the symbol positions, (iii) determining any award associated with any winning combination of said symbols generated along the formed supplemental payline, and (iv) providing any determined award to the player.

14. The gaming device of claim 13, wherein when executed by the at least one processor, said plurality of instructions cause the at least one processor to control the play of the game by forming a plurality of supplemental paylines.

15. A gaming device comprising:

at least one display device;

at least one input device;

at least one processor; and at least one memory device which stores a plurality of instructions, which when executed by the at least one processor, cause the at least one processor to operate with the at least one display device and the at least one input device to control each play of a game by:

(a) enabling a player to wager on a payline associated with a plurality of symbol generators, each of said plurality of symbol generators associated with a plurality of symbol positions;

(b) generating a plurality of symbols at said plurality of symbol positions;

(c) determining any award associated with any winning combination of said symbols generated along said wagered on payline;

(d) providing any determined award to the player;

(e) determining if any predetermined emanator symbols and any predetermined attractor symbols are generated at said symbol positions, wherein for each play of the game, said predetermined emanator symbols are distinct from said predetermined attractor symbols; and (f) if at least one predetermined emanator symbol and at least one predetermined attractor symbol are generated at said symbol positions:

(i) forming and displaying a supplemental payline, wherein said supplemental payline emanates from the generated emanator symbol to said generated attractor symbol, (ii) determining any award associated with any winning combination of said symbols generated along the formed supplemental payline, and (iii) providing any determined award to the player.

16. The gaming device of claim 15, wherein said plurality of symbols includes a plurality of predetermined emanator symbols.

17. The gaming device of claim 15, wherein said plurality of symbols includes a plurality of predetermined attractor symbols.

18. The gaming device of claim 15, wherein when executed by the at least one processor, said plurality of instructions cause the at least one processor to control each play of the game by forming a plurality of supplemental paylines if at least one predetermined emanator symbol is generated and a plurality of predetermined attractor symbols are generated, wherein each supplemental payline emanates from the generated emanator symbol to a different one of the generated attractor symbols.

19. The gaming device of claim 15, wherein when executed by the at least one processor, said plurality of instructions cause the at least one processor to control each play of the game by forming a plurality of supplemental paylines if a plurality of predetermined emanator symbols are generated and at least one predetermined attractor symbols is generated, wherein each supplemental payline emanates from a different one of the generated emanator symbols to the generated attractor symbol.

20. A method of operating a gaming device, said comprising:

(a) causing at least one processor to execute a plurality of instructions to operate with at least one input device to enable a player to wager on a payline, wherein said payline forms a predetermined path along a plurality of symbol positions;

(b) causing the at least one processor to execute the plurality of instructions to generate a plurality of symbols;

(c) causing the at least one processor to execute the plurality of instructions to evaluate said symbols generated along the wagered on payline in a first direction to determine any award associated with any winning combination of said symbols generated along the wagered on payline;

(d) providing any determined award to the player;

(e) causing the at least one processor to execute the plurality of instructions to determine whether a reflector symbol is generated on the wagered on payline; and (f) if said reflector symbol is generated on the wagered on payline, prior to evaluating any symbols generated along any of the wagered on paylines in any other direction:

(i) causing the at least one processor to execute the plurality of instructions to form a supplemental payline which extends back across a number of symbol positions, wherein said supplemental payline extends back along a different path than the wagered on payline, (ii) causing the at least one processor to execute the plurality of instructions to operate with at least one display device to display the formed supplemental payline, (iii) causing the at least one processor to execute the plurality of instructions to determine any award associated with any winning combination of said symbols generated along the formed supplemental payline, and (iv) providing any determined award to the player.

21. The method of claim 20, which includes causing the at least one processor to execute the plurality of instructions to form a plurality of supplemental paylines if said reflector symbol is generated on the wagered on payline.

22. The method of claim 21, wherein each supplemental payline extends back across a number of symbol positions along a different path than the wagered on payline.

23. The method of claim 20, wherein the number of symbol positions the supplemental payline extends back across is based on the player's wager.

24. The method of claim 20, which includes causing the at least one processor to execute the plurality of instructions to regenerate at least one of the symbols at least one of the symbol positions which the supplemental payline intersects.

25. The method of claim 20, which includes causing the at least one processor to execute the plurality of instructions to operate with the at least one input device to enable the player to wager on a plurality of paylines.

26. The method of claim 20, which is provided through a data network.

27. The method of claim 26, wherein the data network is an internet.

28. A method of operating a gaming device, said method comprising:

(a) causing at least one processor to execute a plurality of instructions to operate with at least one input device to enable a player to wager on a payline, wherein said payline extends across a plurality of symbol positions along a predetermined path;

(b) causing the at least one processor to execute the plurality of instructions to generate a plurality of symbols;

(c) causing the at least one processor to execute the plurality of instructions to determine any award associated with any winning combination of said symbols generated along the wagered on payline;

(d) providing any determined award to the player;

(e) causing the at least one processor to execute the plurality of instructions to determine whether an emanator symbol is generated; and (f) if said emanator symbol is generated:

(i) causing the at least one processor to execute the plurality of instructions to form at least one supplemental payline, wherein each supplemental payline emanates from the generated emanator symbol to a number of symbol positions, each supplemental payline emanates along a different path than the wagered on payline and the path of each supplemental payline is formed regardless of the path of the wagered on payline, (ii) causing the at least one processor to execute the plurality of instructions to operate with at least one display device to display the at least one formed supplemental symbol, (iii) causing the at least one processor to execute the plurality of instructions to determine any award associated with any winning combination of said symbols generated along the formed supplemental payline, and (iv) providing any determined award to the player.

29. The method of claim 28, which includes causing the at least one processor to execute the plurality of instructions to form a plurality of supplemental paylines if said emanator symbol is generated.

30. The method of claim 28, which includes causing the at least one processor to execute the plurality of instructions to operate with the at least one input device to enable the player to wager on a plurality of paylines.

31. The method of claim 28, which includes causing the at least one processor to execute the plurality of instructions to regenerate at least one of the symbols at least one of the symbol positions which the supplemental payline intersects.

32. The method of claim 28, which is provided through a data network.

33. The method of claim 32, wherein the data network is an internet.

34. A method of operating a gaming device, said method comprising:

(a) causing at least one processor to execute a plurality of instructions to operate with at least one input device to enable a player to wager on a payline;

(b) causing the at least one processor to execute the plurality of instructions to generate a plurality of symbols at a plurality symbol positions;

(c) causing the at least one processor to execute the plurality of instructions to determine any award associated with any winning combination of said symbols generated along the wagered on payline;

(d) providing any determined award to the player;

(e) causing the at least one processor to execute the plurality of instructions to determine whether to form at least one supplemental payline; and (f) if the determination is to form at least one supplemental payline:

(i) independent from the generation of the symbols at the plurality of symbol positions, selecting one of the symbol positions, (ii) causing the at least one processor to execute the plurality of instructions to form at least one supplemental payline, wherein each supplemental payline is formed in at least one direction from the selected symbol position to at least another one of the symbol positions, (iii) causing the at least one processor to execute the plurality of instructions to operate with at least one display device to display the at least one formed supplemental payline, (iv) causing the at least one processor to execute the plurality of instructions to determine any award associated with any winning combination of said symbols generated along the formed supplemental payline, and (v) providing any determined award to the player.

35. The method of claim 34, which includes causing the at least one processor to execute the plurality of instructions to form a plurality of supplemental paylines.

36. The method of claim 34, which is provided through a data network.

37. The method of claim 36, wherein the data network is an internet.

38. A method of operating a gaming device, for each play of a game, said method comprising:

(a) causing at least one processor to execute a plurality of instructions to operate with at least one input device to enable a player to wager on a payline;

(b) causing the at least one processor to execute the plurality of instructions to generate a plurality of symbols;

(c) causing the at least one processor to execute the plurality of instructions to determine any award associated with any winning combination of said symbols generated along the wagered on payline;

(d) providing any determined award to the player;

(e) causing the at least one processor to execute the plurality of instructions to determine if at least one predetermined emanator symbol and at least one predetermined attractor symbol are generated, wherein for each play of the game, said predetermined emanator symbols are distinct from said predetermined attractor symbols; and (f) if at least one predetermined emanator symbol and at least one predetermined attractor symbol are generated:

(i) causing the at least one processor to execute the plurality of instructions to form a supplemental payline, wherein said supplemental payline emanates from the generated emanator symbol to said generated attractor symbol, (ii) causing the at least one processor to execute the plurality of instructions to operate with at least one display device to display the formed supplemental payline, (iii) causing the at least one processor to execute the plurality of instructions to determine any award associated with any winning combination of said symbols generated along the formed supplemental payline, and (iv) providing any determined award to the player.

39. The method of claim 38, which includes causing the at least one processor to execute the plurality of instructions to form a plurality of supplemental paylines if at least one predetermined emanator symbol is generated and a plurality of predetermined attractor symbols are generated, wherein each supplemental payline emanates from the generated emanator symbol to a different one of the generated attractor symbols.

40. The method of claim 38, which includes causing the at least one processor to execute the plurality of instructions to form a plurality of supplemental paylines if a plurality of predetermined emanator symbols are generated and at least one predetermined attractor symbols is generated, wherein each supplemental payline emanates from a different one of the generated emanator symbols to the generated attractor symbol.

41. The method of claim 38, which is provided through a data network.

42. The method of claim 41, wherein the data network is an internet.

* * * * *

UNITED STATES PATENT AND TRADEMARK OFFICE

CERTIFICATE OF CORRECTION

PATENT NO. : 8,128,480 B2
APPLICATION NO. : 11/426448
DATED : March 6, 2012
INVENTOR(S) : David H. Muir It is certified that error appears in the above-identified patent and that said Letters Patent is hereby corrected as shown below:

IN THE CLAIMS:

In Claim 1, Column 29, Line 48, replace “at least one” with --a--.

In Claim 1, Column 29, Line 51, delete “at least one.”

In Claim 1, Column 29, Line 65, delete “of the.”

In Claim 5, Column 30, Line 19, replace “symbol generators” with --the symbol positions--.

In Claim 6, Column 30, Line 24, between “symbols” and “at” insert --at--.

In Claim 8, Column 30, Line 37, replace “at least one” with --a--.

In Claim 8, Column 30, Line 40, delete “at least one.”

In Claim 8, Column 30, Line 61, after “the” insert --at least one--.

In Claim 11, Column 31, Line 7, between “symbols” and “at” insert --at--.

In Claim 11, Column 31, Line 8, between “the” and “supplemental” insert --at least one formed--.

In Claim 13, Column 31, Line 44, before “formed” insert --at least one--.

In Claim 18, Column 32, Lines 31 to 32, between “the” and “generated” insert --at least one--.

In Claim 19, Column 32, Line 41, between “the” and “generated” insert --at least one--.

In Claim 20, Column 32, Lines 43 to 44, between “said” and “comprising” insert --method--.

In Claim 20, Column 32, Line 64, delete “of the.”

In Claim 24, Column 33, Line 27, between “symbols” and “at” insert --at--.

Signed and Sealed this
Fifth Day of June, 2012

David J. Kappos
*Director of the United States Patent and Trademark Office*

IN THE CLAIMS:

In Claim 28, Column 33, Line 67, replace “symbol” with --payline--.

In Claim 28, Column 34, Line 4, between “the” and “formed” insert --at least one--.

In Claim 31, Column 34, Line 18, between “symbols” and “at” insert --at--.

In Claim 31, Column 34, Line 19, between “the” and “supplemental” insert --at least one formed--.

In Claim 34, Column 34, Line 58, between “the” and “formed” insert --at least one--.

In Claim 39, Column 36, Line 12, between “the” and “generated” insert --at least one--.

In Claim 40, Column 36, Line 20, between “the” and “generated” insert --at least one--.